United States Patent
Bae et al.

(10) Patent No.: US 7,133,460 B2
(45) Date of Patent: Nov. 7, 2006

(54) APPARATUS AND METHOD FOR DETERMINING A DATA RATE OF PACKET DATA IN A MOBILE COMMUNICATION SYSTEM

(75) Inventors: Sang-Min Bae, Suwon (KR); Young-Kwon Cho, Suwon (KR); Ho-Kyu Choi, Songnam (KR); Youn-Sun Kim, Seoul (KR); Jin-Woo Heo, Songnam (KR); Jong-Yoon Hwang, Songnam (KR); Hyun-Woo Lee, Suwon (KR); Sung-Jin Kim, Suwon (KR); Chu-Hyon Yi, Seoul (KR); Sun-Gi Ku, Suwon (KR); Hwan-Joon Kwon, Seoul (KR); Ju-Ho Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 1010 days.

(21) Appl. No.: 09/986,216

(22) Filed: Oct. 22, 2001

(65) Prior Publication Data

US 2002/0097697 A1 Jul. 25, 2002

(30) Foreign Application Priority Data

Oct. 20, 2000 (KR) ............................... 2000-62050
Oct. 25, 2000 (KR) ............................... 2000-63052

(51) Int. Cl.
*H04L 27/04* (2006.01)
*H04B 1/707* (2006.01)

(52) U.S. Cl. ...................................... 375/295; 375/146

(58) Field of Classification Search ................ 375/295, 375/225, 146; 370/208, 209, 332, 333, 468, 370/493
See application file for complete search history.

(56) References Cited

U.S. PATENT DOCUMENTS

| 6,064,678 | A | 5/2000 | Sindhushayana et al. |
| 6,690,652 | B1* | 2/2004 | Sadri ........................... 370/252 |
| 6,859,446 | B1* | 2/2005 | Gopalakrishnan et al. .. 370/335 |
| 6,912,228 | B1* | 6/2005 | Dahlman et al. ........... 370/441 |

FOREIGN PATENT DOCUMENTS

| WO | WO 00/04728 | 1/2000 |
| WO | WO 00/32007 | 6/2000 |

OTHER PUBLICATIONS

Australian Office Action dated Sep. 11, 2002, issued in a counterpart application, namely, Appln. No. 11041/02.

* cited by examiner

*Primary Examiner*—Kevin Kim
(74) *Attorney, Agent, or Firm*—Dilworth & Barrese LLP

(57) ABSTRACT

Disclosed is a mobile station for determining a data rate for a packet data service in a mobile communication system including a base station, and the mobile station being provided with a voice service and a packet data service from the base station. In the mobile station, a receiver receives orthogonal code allocation information indicating the number of orthogonal codes allocated for the packet data service, a measurer measures a CIR using a received pilot channel, and a controller determines a data rate corresponding to the measured CIR, controls the determined data rate based on the number of the allocated orthogonal codes, and determines a controlled data rate.

52 Claims, 22 Drawing Sheets

APPARATUS AND METHOD FOR DETERMINING A DATA RATE OF PACKET DATA IN A MOBILE COMMUNICATION SYSTEM

This application claims priority to an application entitled "Apparatus and Method for Adaptively Determining Data Rate of Packet Data and Modulation/Demodulation Parameter in a Mobile Communication System Supporting Voice and Packet Data Services" filed in the Korean Industrial Property Office on Oct. 20, 2000 and assigned Serial No. 2000-62050, and an application entitled "Apparatus and Method for Effectively Determining Data Rate in a Mobile Communication System Supporting Voice and Packet Data Services" filed in the Korean Industrial Property Office on Oct. 25, 2000 and assigned Serial No. 2000-63052, the contents of both of which are hereby incorporated by reference.

BACKGROUND OF THE INVENTION

1. Field of the Invention

The present invention relates generally to a mobile communication system supporting a multimedia service including voice and packet data services, and in particular, to an apparatus and method for determining a data rate of packet data.

2. Description of the Related Art

A typical mobile communication system, such as an IS-2000 CDMA (Code Division Multiple Access) mobile communication system, has been designed to support a voice service only. However, over time, the mobile communication system has been developed to support a data service as well, in order to meet the growing requirement for high-speed data transmission. Further, a so-called "HDR (High Data Rate)" mobile communication system has been proposed to support a high-speed data service only.

As stated above, the existing mobile communication system was designed to support either the voice service only, or the data service only. That is, although the mobile communication system is required to simultaneously support the voice service and the data service, the conventional mobile communication system was designed to separately support the services. Therefore, there is a demand for a mobile communication system capable of supporting the data service as well as the existing voice service.

SUMMARY OF THE INVENTION

It is, therefore, an object of the present invention to provide an apparatus and method for controlling a data rate of packet data in a mobile communication system supporting voice and packet data services.

It is another object of the present invention to provide an apparatus and method for determining a data rate of packet data considering available orthogonal (Walsh) codes and physical channel characteristics of a transmission channel and setting modulation/demodulation parameters according to the determined data rate, in a mobile communication system where a voice user and a packet data user coexist.

In accordance with a first object of the present invention, there is provided a mobile station for determining a data rate for a packet data service in a mobile communication system including a base station. The mobile station is provided with a voice service and a packet data service from the base station. The mobile station comprises a receiver for receiving orthogonal code allocation information indicating the number of orthogonal codes allocated for the packet data service; a measurer for measuring a CIR (Carrier to Interference Ratio) using a received pilot channel; and a controller for determining a data rate corresponding to the measured CIR, controlling the determined data rate based on the number of the allocated orthogonal codes, and determining a controlled data rate.

In accordance with a second object of the present invention, there is provided a mobile station for selecting a base station for a packet data service from a plurality of base stations in a mobile communication system including a plurality of the base stations. The mobile station is provided with a voice service and a packet data service from the base stations. The mobile station comprises a measurer for measuring CIRs using pilot channels received from the respective base stations; a controller for determining data rates corresponding to the measured CIRs of the respective base stations, and determining a base station having the highest data rate among the data rates of the respective base stations as a base station to which a data rate request is to be transmitted; and a transmitter for transmitting a signal for selecting the determined base station.

In accordance with a third object of the present invention, there is provided an apparatus for determining a data rate for a packet data service in a mobile communication system including a base station and a mobile station being provided with a voice service and a packet data service from the base station. The mobile station measures a CIR using a received pilot channel, determines a data rate corresponding to the measured CIR, and transmits information on the determined data rate to the base station. The base station receives the information on the determined data rate, controls the determined data rate based on the number of orthogonal codes allocated for the packet data service, and determines a controlled data rate.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1A:
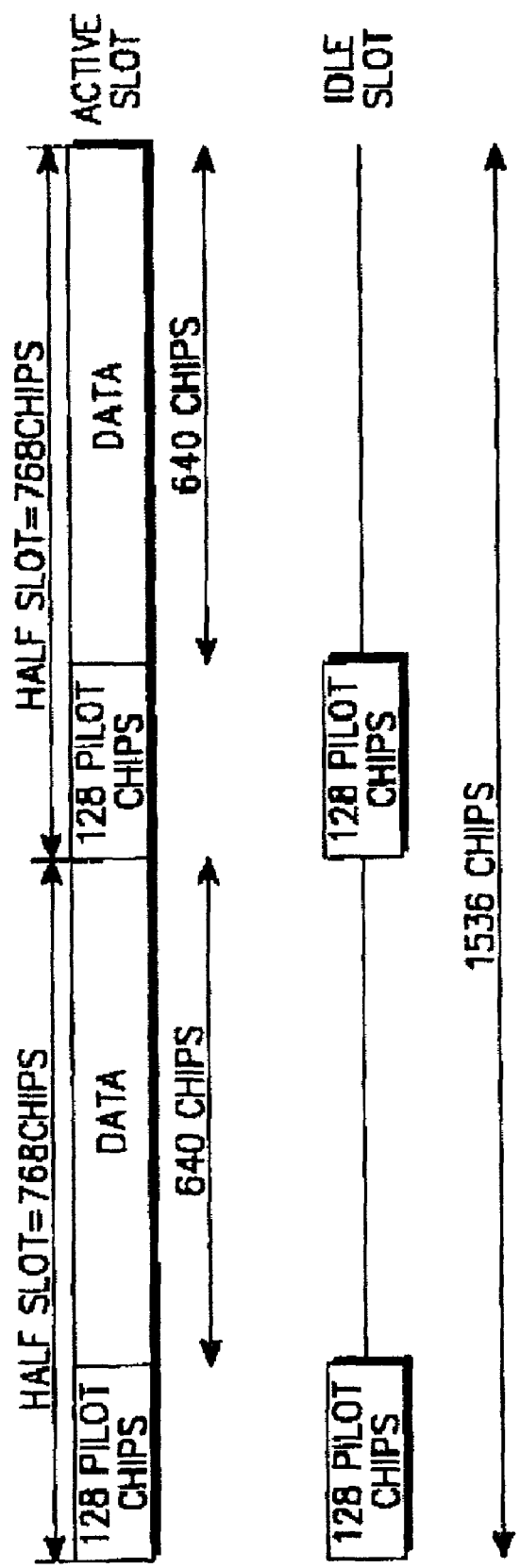
FIG. 1A illustrates a structure of a forward link data traffic channel for a packet data service according to an embodiment of the present invention.

A preferred embodiment of the present invention will be described herein below with reference to the accompanying drawings. In the following description, well-known functions or constructions are not described in detail since they would obscure the invention in unnecessary detail.

The present invention relates to a forward link of a mobile communication system capable of supporting a multimedia service including a voice service and a data service using a 1x bandwidth. A transmitter, channels and a receiver for supporting the voice service are identical in structure to a transmitter, channels and a receiver of the existing 1x system. Here, the "1x bandwidth" refers to a 1.25 MHz frequency bandwidth used in an existing IS-95 synchronous system, and the "1x system" refers to a system supporting the 1x bandwidth. The data service can be classified into a circuit mode operation and a packet mode operation according to its circuit connection type. The data service includes various video services such as a video conference service, and an Internet service. The data service operating in the circuit mode uses the intact structure of the transmitter, channels, and receiver of the existing 1x system. Thus, reference will be made to the structure of the transmitter, channels and receiver for the packet data service.

Table 1 illustrates the channels required for the forward link packet data service in the mobile communication system according to an embodiment of the present invention.

TABLE 1

| Channel | Use | Remarks |
|---|---|---|
| Pilot Channel | This channel is multiplexed with a preamble subchannel and a data traffic subchannel before transmission. A pilot symbol provided over the pilot channel is utilized as an amplitude reference value for sync demodulation and can also be utilized as an auxiliary means of increasing accuracy of CIR measurement for data rate control. | Data Traffic Channel |
| Preamble Subchannel | This channel is multiplexed with the pilot channel and the data traffic subchannel before transmission, and is used to designate a mobile station corresponding to the data packet transmitted by a base station (BS). | Data Traffic Channel |
| Data Traffic Subchannel | This channel is multiplexed with the pilot channel and the preamble subchannel to actually transmit a payload. | Data Traffic Channel |
| QoS Matching Indication Channel | This channel uses a QoS matching technique to guarantee different QoS for respective data services, and is used to transmit QoS matching-related information. | Data Traffic MAC Channel |
| Walsh Space Indication Subchannel | This channel is used to transmit information on a BS Walsh space that can be allocated to the data traffic subchannel through dynamic Walsh allocation. | Data Traffic MAC Channel |
| Reverse Activity Indication Subchannel | This channel is a broadcast channel for controlling a traffic load of a reverse link. | Data Traffic MAC channel |

Referring to Table 1, the channels for the forward link packet data service according to an embodiment of the present invention are classified into a data traffic channel and a data traffic MAC (Medium Access Control) channel. The data traffic channel is comprised of a pilot channel, a preamble subchannel and a data traffic subchannel. The data traffic MAC channel is comprised of a QoS (Quality of Service) matching indication channel, a Walsh space indication subchannel and a reverse activity indication subchannel. The pilot channel is multiplexed with the preamble subchannel and the data traffic subchannel before transmission. A pilot symbol provided over the pilot channel is utilized as an amplitude reference value for sync demodulation and can also be utilized as an auxiliary means of increasing accuracy of CIR measurement for data rate control. The preamble channel is multiplexed with the pilot channel and the data traffic subchannel before transmission, and is used to designate a mobile station (MS) corresponding to the data packet transmitted by a base station (BS). The data traffic subchannel is multiplexed with the pilot channel and the preamble subchannel to actually transmit a payload. The QoS matching indication channel uses a QoS matching technique to guarantee different QoS for respective data services, and is used to transmit QoS matching-related information. The QoS matching indication channel becomes an I-channel component of the data traffic MAC channel. The Walsh space indication subchannel is used to transmit Walsh space information of the base station, which can be allocated to the data traffic subchannel through dynamic Walsh allocation. The Walsh space indication subchannel is multiplexed with the reverse activity indication subchannel to become a Q-channel component of the data traffic MAC channel. The reverse activity indication subchannel is a broadcast channel for controlling a traffic load of a reverse link, and is multiplexed with the Walsh space indication subchannel to become the Q-channel component of the data traffic MAC channel.

In addition to the channels listed in Table 1, a channel for the forward link packet data service according to the embodiment of the present invention includes a common power control channel (CPCCH) for controlling transmission power of a physical channel for the data service operating in the circuit mode in the reverse link.

Figure 1B:
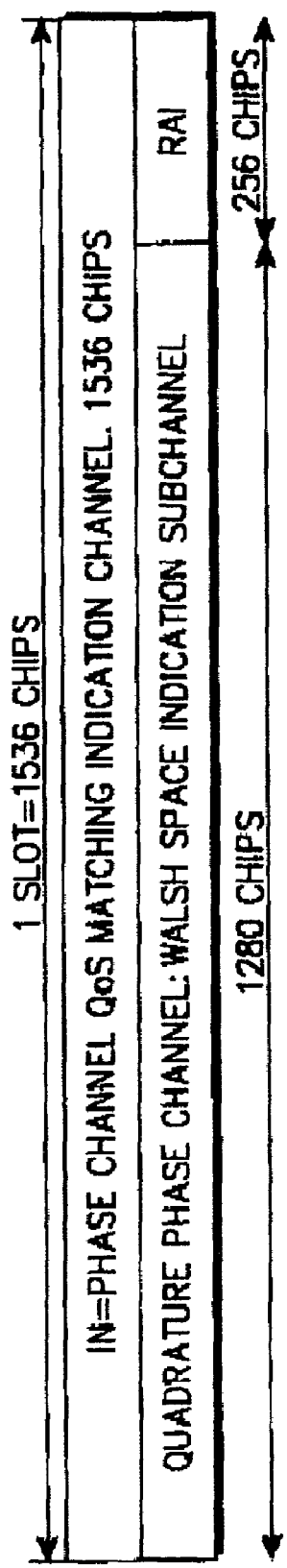
FIG. 1B illustrates a structure of a forward link data traffic MAC (Medium Access Control) channel for a packet data service according to an embodiment of the present invention.

FIG. 1A illustrates a structure of a forward link data traffic channel for a packet data service according to an embodiment of the present invention, and FIG. 1B illustrates a structure of a forward link data traffic MAC channel for a packet data service according to an embodiment of the present invention. Referring to FIGS. 1A and 1B, a minimum transmission unit of a physical channel for the packet data service is a 1,536-chip slot having a 1.25 msec duration.

Referring to FIG. 1A, one slot of the data traffic channel (DTCH) is divided into two half slots, each comprised of 768 chips. A leading 128-chip period of each half slot is allocated to the pilot channel (PICH) for inserting a pilot symbol. In each half slot, the remaining 640 chips, except for the part allocated to the PICH, are allocated to the data traffic subchannel (DTSCH) for a payload. In the case of an idle slot where no payload exists, the DTSCH is gated-off thereby to reduce interference to a service connected in the circuit mode and a signal from an adjacent base station.

Referring to FIG. 1B, the data traffic MAC channel (DTMACCH) is comprised of a first channel (in-phase (I) channel) and a second channel (quadrature-phase (Q) channel). The first channel is used as the QoS (Quality of Service) matching indication channel (QMICH), while the second channel is used as the Walsh space indication subchannel (WSISCH) and the reverse activity indication subchannel (RAISCH). In each slot, the WSISCH and the RAISCH have a 1,280-chip period and a 256-chip period, respectively. The WSISCH and the RAISCH are multiplexed to each other, thus becoming the second channel of the DTMACCH.

Meanwhile, the preamble subchannel (PSCH) not shown in FIGS. 1A and 1B is multiplexed with the PICH and the DTSCH, and then transmitted over the DTCH. Since the PSCH is used to designate a mobile station corresponding to a data packet transmitted by a base station, it should exist in a leading part of a first slot of the DTCH for transmitting a physical layer packet. A preamble symbol may have a value of '0'.

Figure 2:
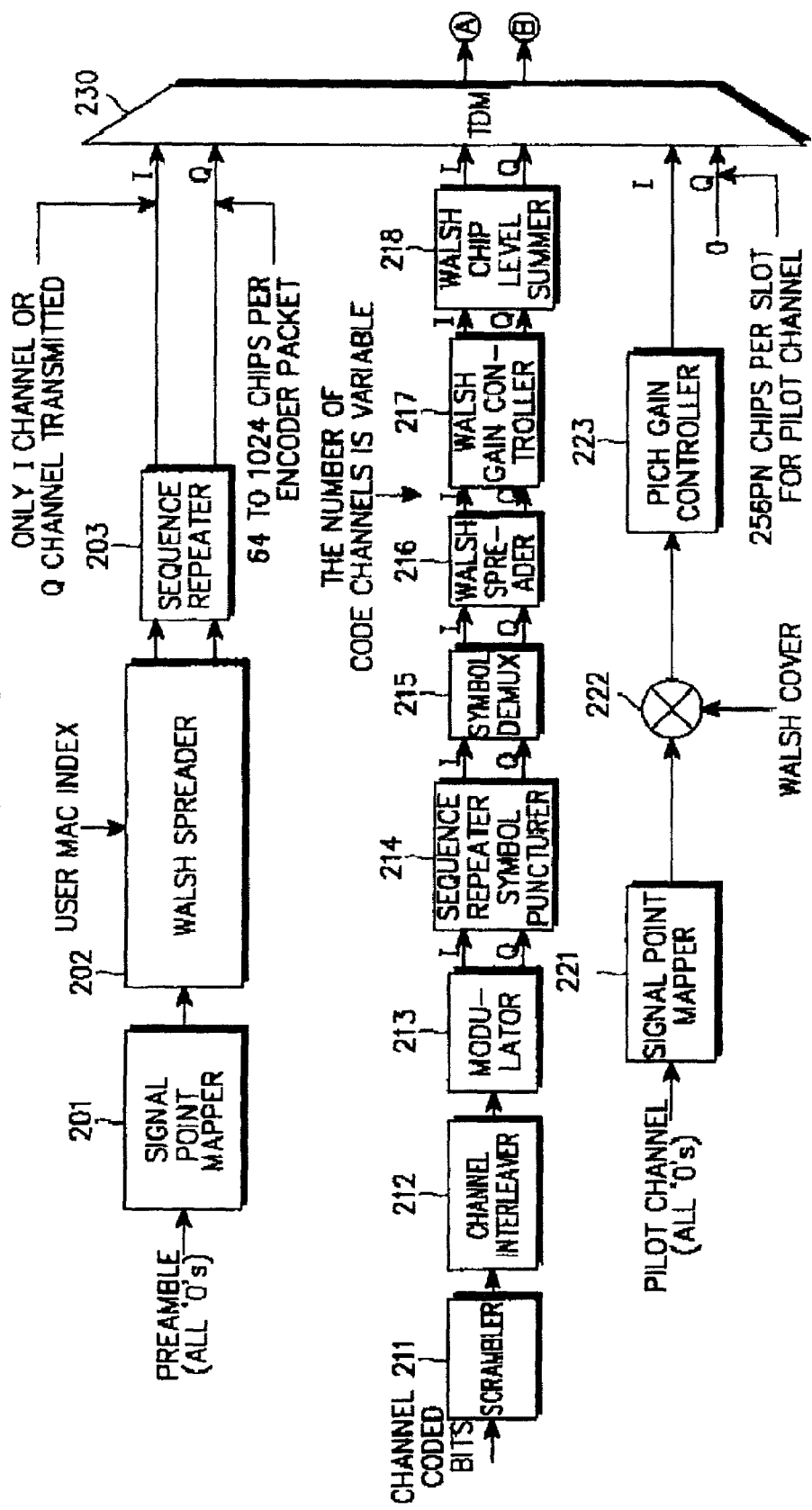
FIG. 2 illustrates a structure of a forward link transmitter for a data traffic channel according to an embodiment of the present invention.

FIG. 2 illustrates a structure of a forward link transmitter for a data traffic channel according to an embodiment of the present invention. The forward link data traffic channel transmitter transmits a preamble subchannel (PSCH) signal, a data traffic subchannel (DTSCH) signal and a pilot channel (PICH) signal by time division multiplexing (TDM).

Referring to FIG. 2, an input preamble symbol having a value '0' is mapped to a value '+1' by a signal point mapper 201. The output symbol of the signal point mapper 201 is spread with a specific 64-ary biorthogonal Walsh code (or sequence) corresponding to a unique user MAC ID (Identification, or index) by a Walsh spreader 202. The Walsh spreader 202 outputs a first-channel (I-channel) sequence and a second-channel (Q-channel) sequence. The output sequences of the Walsh spreader 202 are subject to sequence repetition according to a data rate (or transmission rate) in a sequence repeater 203. The sequence repeater 203 can repeat the output sequences of the Walsh spreader 202 as many as a maximum of 16 times according to the data rate. Therefore, the PSCH included in one slot of the DTCH can last (continue) for anywhere in the range from 64 chips up to a maximum of 1,024 chips according to the data rate. The I and Q sequences output from the sequence repeater 203 are provided to a time division multiplexer (TDM) 230 where they are multiplexed with PICH and DTSCH.

A scrambler 211 scrambles a channel-coded bit sequence, and the output sequence of the scrambler 211 is interleaved by a channel interleaver 212. The size of the channel interleaver 212 depends on the size of the physical layer packet. The output sequence of the channel interleaver 212 is mapped to M-ary symbols by an M-ary symbol modulator 213. The M-ary symbol modulator 213 serves as a QPSK (Quadrature Phase Shift Modulation) modulator, a 8-PSK (8-ary Phase Shift Keying) or a 16-QAM (16-ary Quadrature Amplitude Modulation) modulator according to the data rate, and the modulation mode may be changed in a unit of a physical layer packet having a variable data rate. The I and Q sequences of the M-ary symbols output from the M-ary symbol modulator 213 are subject to sequence repetition/symbol puncturing according to the data rate in a sequence repeater/symbol puncturer 214. The I and Q M-ary symbol sequences output from the sequence repeater/symbol puncturer 214 are demultiplexed into N Walsh code channels available for the DTSCH by a symbol demultiplexer 215. The number, N, of the Walsh codes used for the DTSCH is variable, and the Walsh code number information is broadcast over the WSISCH. The mobile station then determines a data rate of the base station depending on this information, and sends the determined data rate information to the base station. Therefore, the mobile station can detect an allocation state of the Walsh codes used for the currently received DTSCH. The I and Q symbols, demultiplexed into N Walsh code channels, output from the symbol demultiplexer 215 are spread with associated specific Walsh codes by a Walsh spreader (or Walsh cover generator) 216. The I and Q sequences output from the Walsh spreader 216 are gain-controlled by a Walsh channel gain controller 217. The I and Q sequences output from the Walsh channel gain controller 217 are summed in a chip unit by a Walsh chip level summer 218. The I and Q chip sequences output from the Walsh chip level summer 218 are provided to the time division multiplexer 230 where they are multiplexed with PICH and PSCH.

An input pilot symbol having only a value of '0' is mapped to a value of '+1' by a signal point mapper 221. The output symbol of the signal point mapper 221 is spread with a specific 128-ary Walsh code allocated to the PICH by a Walsh spreader 222. The output sequence of the Walsh spreader 222 is gain-controlled by a pilot channel gain controller 223. The I chip sequence output from the PICH gain controller 223 is provided to the time division multiplexer 230 where it is multiplexed with PSCH and DTSCH.

The time division multiplexer 230 outputs an A signal by multiplexing the I-channel signal of the PICH, the I-channel signal of the DTSCH and the I-channel signal of the PSCH. The I-channel signal of the PICH is the I sequence from the sequence repeater 203, the I-channel signal of the DTSCH is the I sequence from the Walsh chip level summer 218, and the I-channel signal of the PSCH is the output signal of the pilot channel gain controller 223. At the same time, the time division multiplexer 230 outputs a B signal by multiplexing the Q-channel signal of the PICH, the Q-channel signal of the DTSCH and the Q-channel signal of the PSCH. The Q-channel signal of the PICH is the Q sequence from the sequence repeater 203, the Q-channel signal of the DTSCH is the Q sequence from the Walsh chip level summer 218, and the Q-channel signal of the PSCH is '0'.

Figure 3:
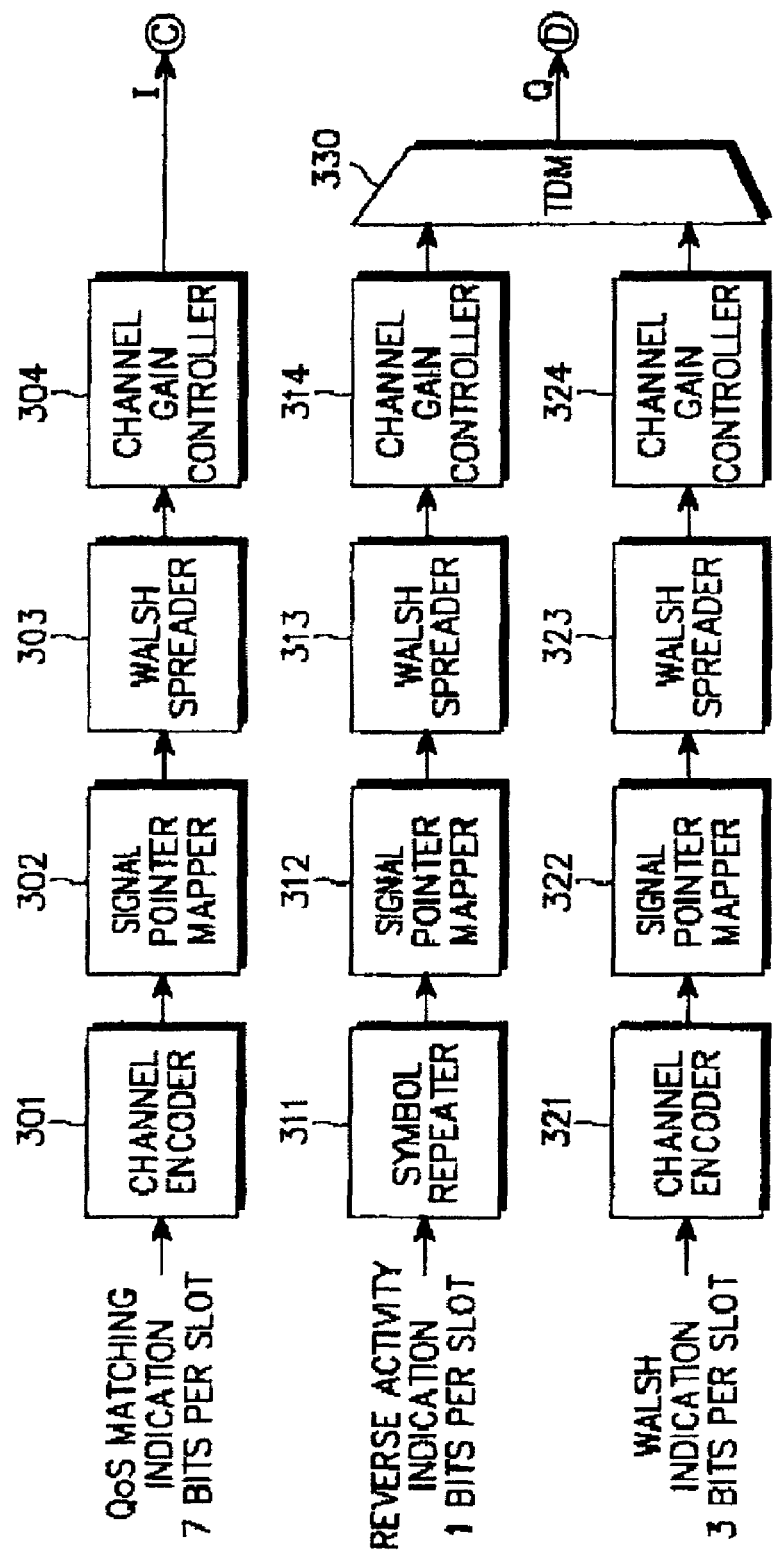
FIG. 3 illustrates a structure of a forward link transmitter for a data traffic MAC channel according to an embodiment of the present invention.

FIG. 3 illustrates a structure of a forward link transmitter for a data traffic MAC channel according to an embodiment of the present invention. Referring to FIG. 3, a QMICH represented by numerals 301–304 is a subchannel of the DTMACCH, for transmitting QoS matching information used to independently guarantee the QoS of the respective data services. For the QoS matching information, 7 bits are provided per slot. The 7-bit QoS matching information is provided to a channel encoder 301. For channel encoding of the 7-bit QoS matching information, the channel encoder 301 can use a block code or a convolutional code. For example, a (24,7) block code can be used as a block code of the channel encoder 301. The output symbols of the channel encoder 301 are provided to a signal point mapper 302. The signal point mapper 302 maps an output symbol '0' of the channel encoder 301 to '+1' and an output symbol '1' of the channel encoder 301 to '−1'. The output symbols of the signal point mapper 302 are spread with a specific 64-ary Walsh code allocated to the DTMACCH by a Walsh spreader (or Walsh code generator) 303. The chip sequence output from the Walsh spreader 303 is gain-controlled by a channel gain controller 304. The output of the gain controller 304 becomes a first-channel (I-channel) component of the DTMACCH.

An RAISCH represented by reference numerals 311–314 is a subchannel of the DTMACCH, i.e., a broadcast channel for controlling a traffic load of the reverse link. In the traffic load control information of the reverse link, one bit is provided per slot. The 1-bit RAI (Reverse Activity Indication) information is repeated four times by a symbol repeater 311. The output symbols of the symbol repeater 311 are provided to a signal point mapper 312. Among the output symbols of the symbol repeater 311, a symbol '0' is mapped to '+1' and a symbol '1' is mapped to '−1' by the signal point mapper 312. The output symbols of the signal point mapper 312 are spread with a specific 64-ary Walsh code allocated to the DTMACCH by a Walsh spreader 313. The chip sequence output from the Walsh spreader 313 are gain-controlled by a channel gain controller 314. The output of the channel gain controller 314 is provided to a time division multiplexer (TDM) 330 where it is multiplexed with WSISCH. The multiplexed signal becomes a second-channel (Q-channel) component of the DTMACCH.

A WSISCH represented by reference numerals 321–324 is a subchannel of the DTMACCH, i.e., a channel for transmitting information on BS Walsh space that can be allocated to the DTSCH through dynamic Walsh allocation. As a first example, when the Walsh codes other than a Walsh code allocated to a circuit mode physical channel are used by the DTSCH at a spreading factor SF=32, it is possible to allocate a maximum of 28 32-ary Walsh codes to the DTSCH. As a second example, when the Walsh codes other than a Walsh code allocated to the circuit mode physical channel are used by the DTSCH at a spreading factor SF=64, it is possible to allocate a maximum of 56 64-ary Walsh codes to the DTSCH. As a third example, when the Walsh codes other than a Walsh code allocated to the circuit mode physical channel are used by the DTSCH at a spreading factor SF=128, it is possible to allocate a maximum of 112 128-ary Walsh codes to the DTSCH. Herein below, the invention will be described with reference to the first example stated above.

If it is specified that the Walsh code used by the PICH should necessarily be used by the DTSCH, it is possible to transmit the Walsh space information with 27 bits by using flag bits for the remaining 27 32-ary Walsh codes. If it is specified that the flag bits for the 27 Walsh codes should be transmitted by three bits per slot over 9 slots, the Walsh space information is provided by three bits per every slot.

The 3-bit Walsh space information is provided to a channel encoder 321. For channel encoding of the 3-bit Walsh space information, the channel encoder 321 can use a block code or a convolutional code. For example, for channel encoding of the 3-bit Walsh space information, a (20,3) block code or a (180,27) block code can be used as a block code of the channel encoder 321. The output symbols of the channel encoder 321 are provided to a signal point mapper 322. Among the output symbols of the channel encoder 321, a symbol '0' is mapped to '+1' and a symbol '1' is mapped to '−1' by the signal point mapper 322. The output symbols of the signal point mapper 322 are spread with a specific 64-ary Walsh code allocated to the DTMACCH by a Walsh spreader 323. The chip sequence output from the Walsh spreader 323 is gain-controlled by a channel gain controller 324. The output of the channel gain controller 324 is provided to the time division multiplexer 330 where it is multiplexed with the RACH. The multiplexed signal becomes a second-channel (Q-channel) component of the DTMACCH.

Figure 4:
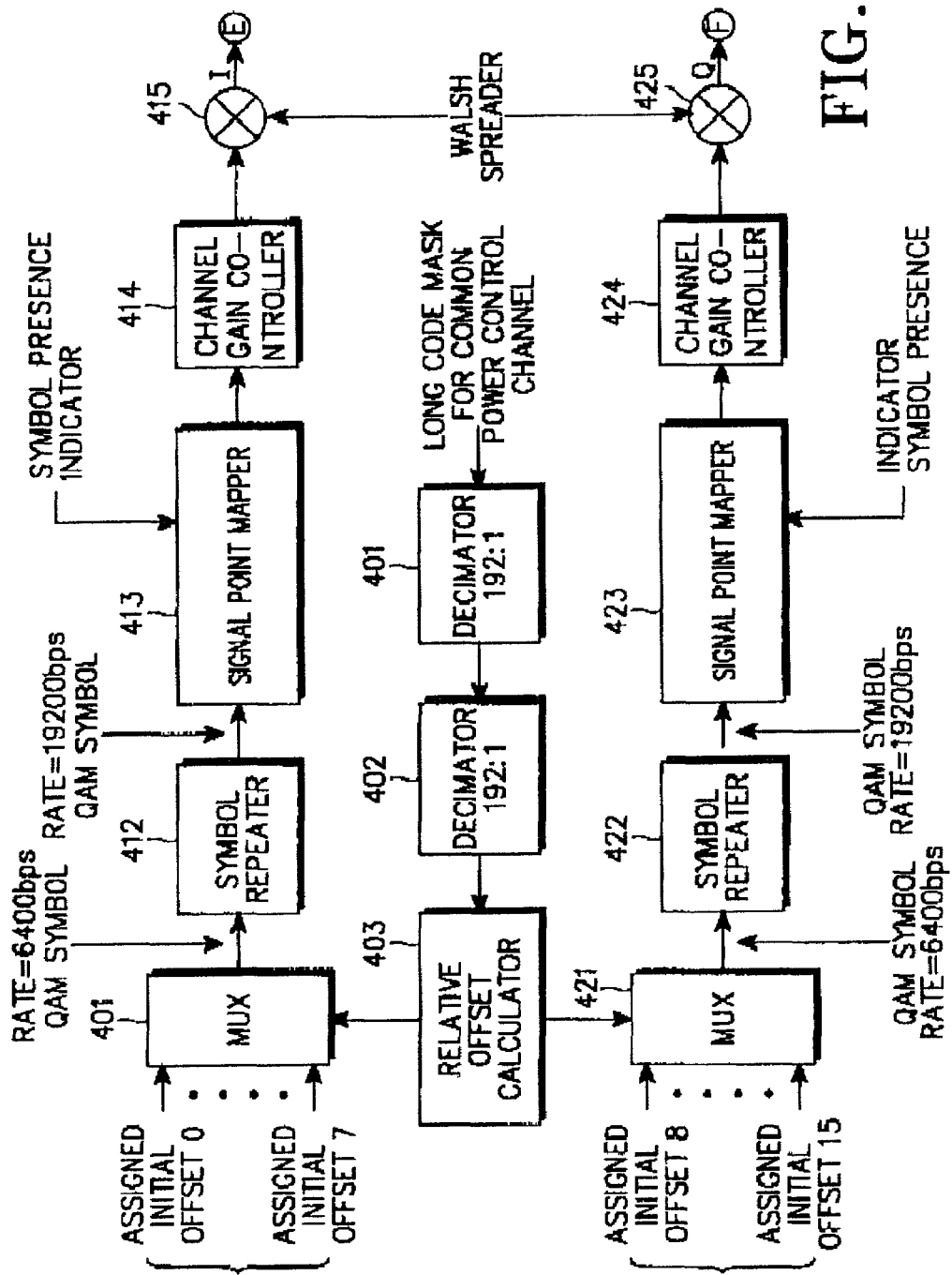
FIG. 4 illustrates a structure of a forward transmitter for a common power control channel (CPCCH) according to an embodiment of the present invention.

FIG. 4 illustrates a structure of a forward transmitter for a common power control channel (CPCCH) according to an embodiment of the present invention. The forward link CPCCH transmitter controls transmission power of a physical channel for a data service operating in the circuit mode in the reverse link.

It is possible to control transmission power of a reverse link physical channel through the CPCCH shown in FIG. 4 on a slot unit basis. The CPCCH is divided into a first channel (I channel) and a second channel (Q channel), and can transmit power control commands for 8 reverse physical channels through each of the first channel and the second channel. The first channel of the CPCCH is multiplexed with power control command bits for the 8 reverse physical channels. The second channel of the CPCCH is also multiplexed with power control command bits for the 8 reverse physical channels. For the multiplexing, the 8 reverse physical channels each are given different initial offsets. The first channel is given initial offsets 0–7, while the second channel is given initial offsets 8–15.

A long code generator 401 receives a long code mask for the CPCCH, and generates a long code with a 1.2288 MHz clock. The output of the long code generator 401 is decimated by a decimator 402. For example, the decimator 402 can output one symbol every 192 input symbols. The output signal of the decimator 402 is driven with a clock whose frequency is 192 times lower than the clock used for the input signal. The output symbol of the decimator 402 is provided to a relative offset calculator 403. The relative offset calculator 403 calculates a relative offset from the output symbol of the decimator 402.

A multiplexer 411 multiplexes power control command bits for the 8 reverse physical channels using the initial offsets 0–7 for the 8 reverse physical channels and the output of the relative offset calculator 403. The multiplexer 411 can output a signal having a data rate of 6400 bps. The output symbols of the multiplexer 411 are repeated three times by a symbol repeater 412. The output symbols of the symbol repeater 412 can have a data rate of 19200 bps. The output symbols of the symbol repeater 412 are provided to a signal point mapper 413. The signal point mapper 413 maps an input symbol '0' to '+1' and an input symbol '1' to '−1'. When there is no input symbol, the signal point mapper 413 outputs '0'. The output symbols of the signal point mapper 413 are gain-controlled by a channel gain controller 414. The output symbols of the channel gain controller 414 are spread with a specific 64-ary Walsh code allocated to the CPCCH by a Walsh spreader 415. The output signal of the Walsh spreader 415 is a first-channel (I-channel) signal of the CPCCH, and is comprised of the power control command bits for the 8 reverse physical channels.

A multiplexer 421 multiplexes power control command bits for the 8 reverse physical channels using the initial offsets 8–15 for the 8 reverse physical channels and the output of the relative offset calculator 403. The multiplexer 421 can output a signal having a data rate of 6400 bps. The output symbols of the multiplexer 421 are repeated three times by a symbol repeater 422. The output symbols of the symbol repeater 422 can have a data rate of 19200 bps. The output symbols of the symbol repeater 422 are provided to a signal point mapper 423. The signal point mapper 423 maps an input symbol '0' to '+1' and an input symbol '1' to '−1'. When there exists no input symbol, the signal point mapper 423 outputs '0'. The output symbols of the signal point mapper 423 are gain-controlled by a channel gain controller 424. The output symbols of the channel gain controller 424 are spread with a specific 64-ary Walsh code allocated to the CPCCH by a Walsh spreader 425. The output signal of the Walsh spreader 425 is a second-channel (Q-channel) signal of the CPCCH, and is comprised of the power control command bits for the 8 reverse physical channels which are different from the 8 reverse physical channels being subject to power control through the I channel.

Figure 5:
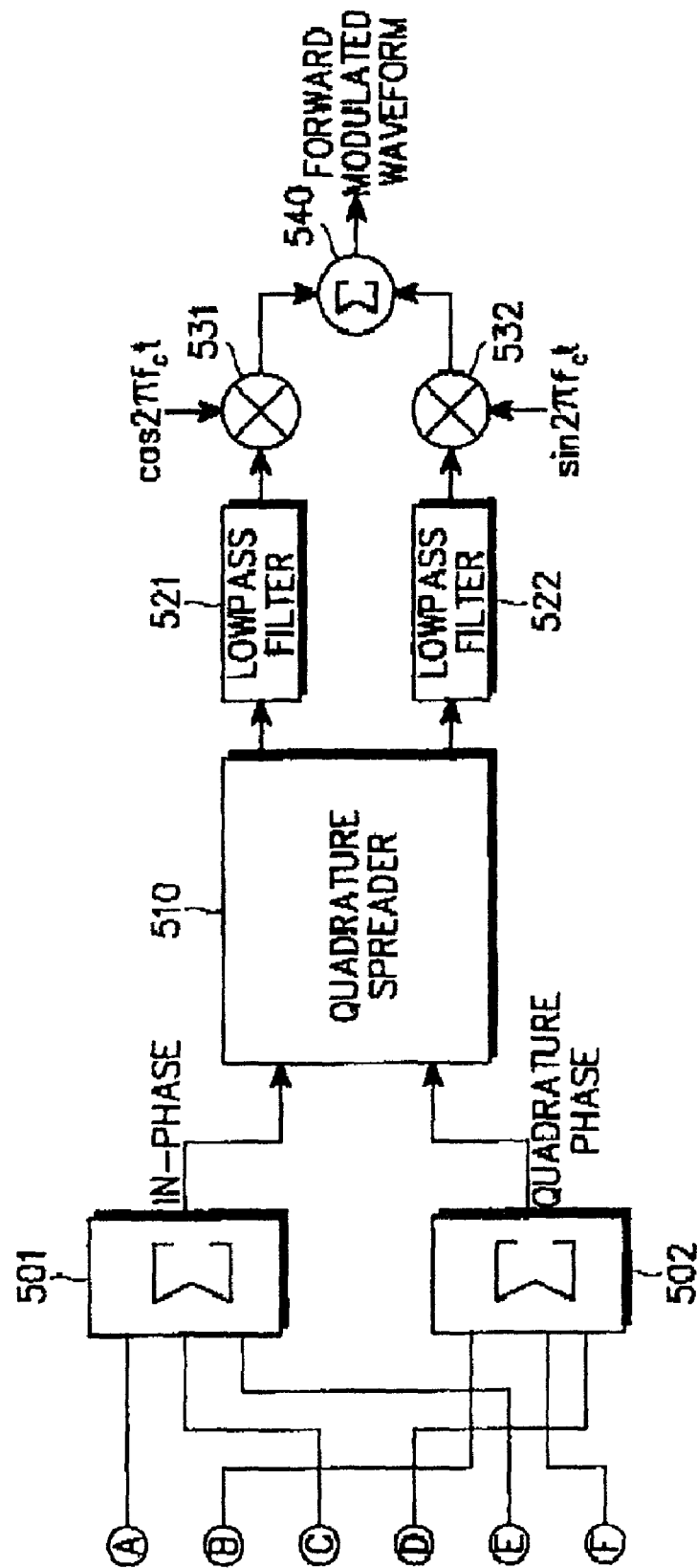
FIG. 5 illustrates a scheme for orthogonally spreading a forward link channel and shifting a radio frequency (RF) band according to an embodiment of the present invention.

FIG. 5 illustrates a scheme for orthogonally spreading a forward link channel and shifting a radio frequency (RF) band according to an embodiment of the present invention. More specifically, FIG. 5 illustrates an operation of orthogonally spreading the respective forward link channel signals as illustrated in FIGS. 2 to 4, and frequency-shifting the spread signals to RF band signals being proper for transmission to the mobile station.

Referring to FIG. 5, a first summer 501 sums up the I-channel signal component of the DTCH, the I-channel signal component of the DTMACCH and the I-channel signal component of the CPCCH. The I-channel signal component of the DTCH is the A signal output from the multiplexer 230 of FIG. 2, the I-channel signal component of the DTMACCH is the output of the gain controller 304 of FIG. 3, and the I-channel signal component of the CPCCH is the output of the Walsh spreader 415 of FIG. 4. The first summer 501 sums up the I-channel (first-channel) input signals in a chip unit. A second summer 502 sums up the Q-channel signal component of the DTCH, the Q-channel signal component of the DTMACCH and the Q-channel signal component of the CPCCH. The Q-channel signal component of the DTCH is the B signal output from the multiplexer 230 of FIG. 2, the Q-channel signal component of the DTMACCH is the output of the multiplexer 330 of FIG. 3, and the Q-channel signal component of the CPCCH is the output of the Walsh spreader 425 of FIG. 4. The second summer 502 sums up the Q-channel (second-channel) input signals in a chip unit.

A quadrature spreader 510 complex-spread (or complex-multiply) an input signal comprised of the signals output from the first and second summers 501 and 502, using a spreading sequence comprised of a first-channel spreading sequence and a second-channel spreading sequence, and then outputs a first-channel signal and a second-channel signal. The first-channel signal from the quadrature spreader 510 is lowpass-filtered by a lowpass filter 521, and the second-channel signal from the quadrature spreader 510 is lowpass-filtered by a lowpass filter 522. The output of the lowpass filter 521 is multiplied by a first frequency $\cos 2\pi f_c t$ by a frequency shifter 531 and thus, shifted to an RF band. The output of the lowpass filter 522 is multiplied by a second frequency $\sin 2\pi f_c t$ by a frequency shifter 532 and thus, shifted to an RF band. A summer 540 sums up the output signal of the frequency shifter 531 and the output signal of the frequency shifter 532. The summed signal from the summer 540 is transmitted through an antenna (not shown).

Figure 6:
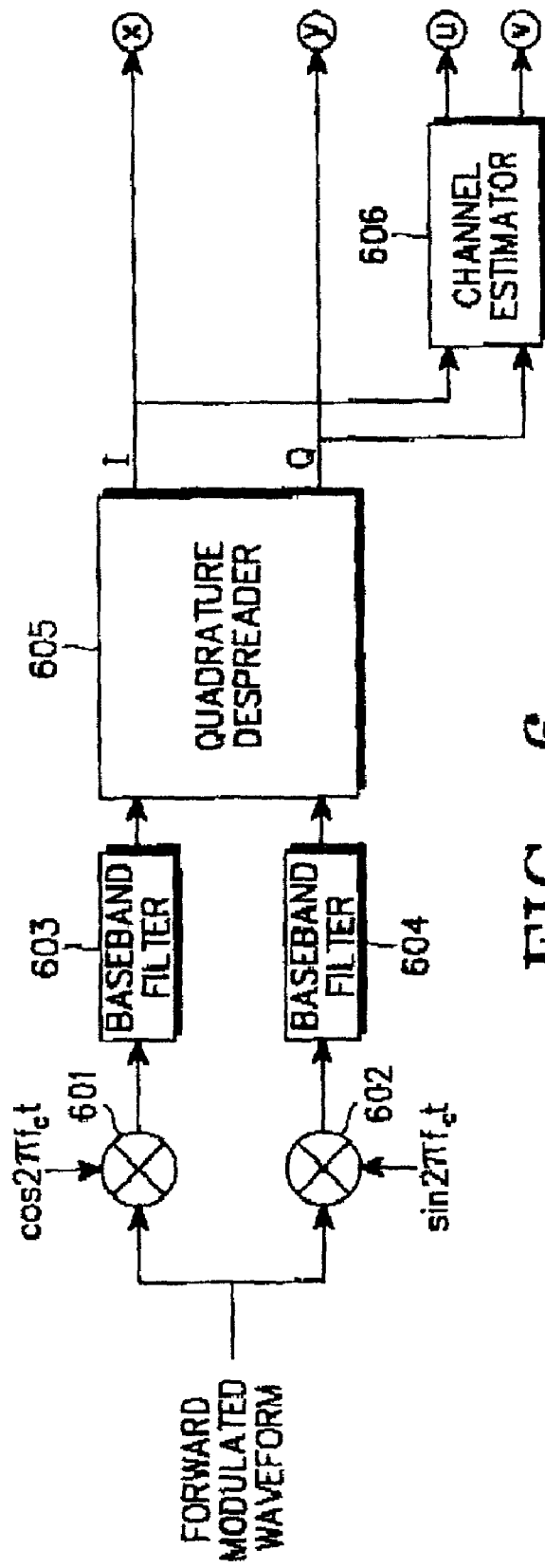
FIG. 6 illustrates a scheme for frequency-down conversion, quadrature despreading and channel estimation according to an embodiment of the present invention.

FIG. 6 illustrates a scheme for frequency-down conversion, quadrature despreading and channel estimation according to an embodiment of the present invention. Referring to FIG. 6, a forward RF signal transmitted from a forward link transmitter, i.e., a base station, is received at a receiving stage of a forward link receiver. The received signal is provided in common to a mixer 601 and a mixer 602. The mixer 601 converts the received signal to a baseband signal by mixing the received signal with a carrier signal $\cos 2\pi f_c t$ to down-convert the received frequency, and provides the baseband signal to a baseband filter 603. The baseband filter 603 baseband-filters the signal output from the mixer 601 and provides the baseband-filtered signal to a quadrature despreader 605. The quadrature despreader 605 quadrature-despreads the signal output from the baseband filter 603, thereby to output the I-channel component separated from the signals from the other base stations and the signals received through the other paths.

Further, the mixer 602 converts the received signal to a baseband signal by mixing the received signal with a carrier signal $\sin 2\pi f_c t$ to down-convert the received frequency, and provides the baseband signal to a baseband filter 604. The baseband filter 604 baseband-filters the signal output from the mixer 602 and provides the baseband-filtered signal to the quadrature despreader 605. The quadrature despreader 605 quadrature-despreads the signal output from the baseband filter 604, thereby to output the Q-channel component separated from the signals from the other base stations and the signals received through the other paths. The I-channel component and the Q-channel component output from the quadrature despreader 605 are provided to a channel estimator 606. The channel estimator 606 performs channel estimation depending on the I-channel component and the Q-channel component provided from the quadrature despreader 605, and demodulates a common pilot channel signal using the channel-estimated signal, thereby estimating the received forward channel signals.

Figure 7:
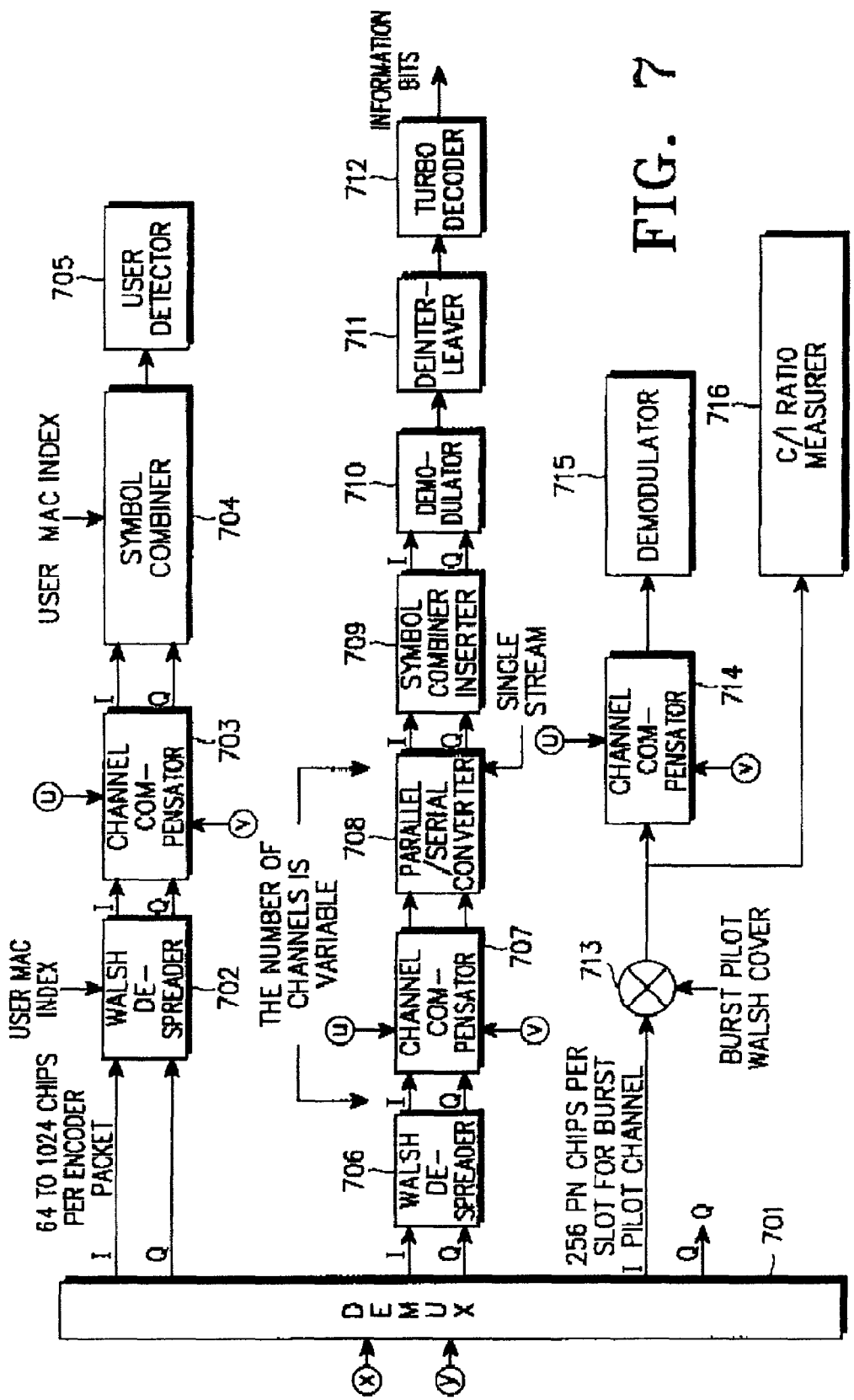
FIG. 7 illustrates a structure of a forward link receiver for a data traffic channel according to an embodiment of the present invention.

FIG. 7 illustrates a structure of a forward link receiver for a data traffic channel according to an embodiment of the present invention. More specifically, FIG. 7 illustrates a structure of a receiver for demodulating a data traffic subchannel, a preamble subchannel and a pilot channel from the quadrature-despread signal transmitted from the transmitter illustrated in FIG. 6.

Referring to FIG. 7, a demultiplexer (DEMUX) 701 receives the I-channel signal component and the Q-channel signal component output from the quadrature despreader 605 shown in FIG. 6. In FIGS. 6 and 7, 'x' and 'y' denote the I-channel component and the Q-channel component, respectively. The demultiplexer 701 demultiplexes the data traffic subchannel, the preamble subchannel and the pilot channel on a time division basis. Among, the data traffic subchannel the preamble subchannel and the pilot channel, the pilot channel always occupies the same position in one slot as shown in FIG. 1A. Thus, the data traffic subchannel and the preamble subchannel are transmitted in the remaining period excepting the period of a position occupied by the pilot channel, and the data traffic channel is transmitted after the preamble subchannel is first transmitted.

First, a process for demodulating the preamble subchannel will be described. The preamble subchannel separated (demultiplexed) by the demultiplexer 701 has a different length according to a data rate of the forward signal, and was spread by the transmitter with the specific 64-ary biorthogonal Walsh code corresponding to a unique MAC ID of a user receiving the forward signal, and received through the I channel or the Q channel according to the unique user MAC ID. In order to demodulate the preamble subchannel signal, the preamble subchannel signal demultiplexed by the demultiplexer 701 is provided to a Walsh despreader 702. The Walsh despreader 702 despreads the preamble subchannel signal output from the demultiplexer 701 with a 64-ary biorthogonal Walsh code determined according to the unique user MAC ID, and provides the despread preamble subchannel signal to a channel compensator 703. The channel compensator 703 performs channel compensation on the output signal of the Walsh despreader 702 using the channel information estimated in FIG. 6, and provides its output signal to a symbol combiner 704. Here, the "estimated channel information" refers to the I-channel component and the Q-channel component output from the channel estimator 606 shown in FIG. 6. In FIGS. 6 and 7, the I-channel component from the channel estimator 606 is represented by 'u' and the Q-channel component is represented by 'v'. The symbol combiner 704 combines only the I-channel component or the Q-channel component of the channel-compensated signal from the channel compensator 703 according to a MAC index of the user MAC ID, and provides the combined signal to a user detector 705. The user detector 705 determines whether the received forward signal is for the corresponding user, by receiving the output signal of the symbol combiner 704.

Second, a process for demodulating the pilot channel will be described. A pilot channel signal having 256 chips per slot, demultiplexed by the demultiplexer 701, is provided to a mixer 713. The mixer 713 multiplies the pilot channel signal output from the demultiplexer 701 by a Walsh code allocated to the pilot channel, and provides its output signal to a channel compensator 714. In order to demodulate a signal on the pilot channel, the channel compensator 714 performs channel compensation on the output signal of the mixer 713 using the channel information estimated in FIG. 6, and provides its output signal to a demodulator 715. Here, the "estimated channel information" refers to the I-channel component and the Q-channel component output from the channel estimator 606 shown in FIG. 6. In FIGS. 6 and 7, the I-channel component from the channel estimator 606 is represented by 'u' and the Q-channel component is represented by 'v'. The channel-compensated signal output from the channel compensator 714 is demodulated into burst pilot data by the demodulator 715. In addition, the output signal of the mixer 713 is provided to a carrier-to-interference (C/I) ratio measurer 716. The C/I ratio measurer 716 determines whether the packet data was subject to QAM modulation, by receiving the output signal of the mixer 713, and if so, provides an amplitude reference point for QAM demodulation.

Third, a process for demodulating the data traffic subchannel will be described. The data traffic subchannel occupies the remaining period excepting the period occupied by the pilot channel and the preamble subchannel having 256 chips per slot. The demultiplexer 701 demultiplexes the data traffic subchannel signal positioned in this period and provides the demultiplexed data traffic subchannel signal to a Walsh despreader 706. The Walsh despreader 706 despreads the data traffic subchannel signal output from the demultiplexer 701 with a plurality of Walsh codes allocated to the data traffic subchannel signal, and provides its output signals to a channel compensator 707. Here, the Walsh despreader 706 outputs its output signals in parallel as many as the number of the Walsh codes allocated to the data traffic subchannel. The channel compensator 707 performs channel compensation on the output signals of the Walsh despreader 706 using the channel information estimated in FIG. 6, and provides output signals to a parallel/serial converter 708. Here, the "estimated channel information" refers to the I-channel component and the Q-channel component output from the channel estimator 606 shown in FIG. 6. In FIGS. 6 and 7, the I-channel component from the channel estimator 606 is represented by 'u' and the Q-channel component is represented by 'v'. The parallel/serial converter 708 converts the signals received in parallel from the channel compensator 707 to serial signals. A symbol combiner/inserter 709 performs symbol combining or insertion on the serial signals output from the parallel/serial converter 708 according to a symbol repetition and puncturing operation performed by the transmitter (or base station). A QPSK/8PSK/16QAM demodulator 710 performs QPSK/8PSK/16QAM demodulation on the output signal of the symbol combiner/inserter 709. A deinterleaver 711 performs deinterleaving on the output signal of the QPSK/8PSK/16QAM demodulator 710 in the reverse operation of the interleaving operation performed by the transmitter, and provides the deinterleaved signal to a turbo decoder 712. The turbo decoder 712 channel-decodes the output signal of the deinterleaver 711 by turbo decoding, and then extracts information bits.

Figure 8:
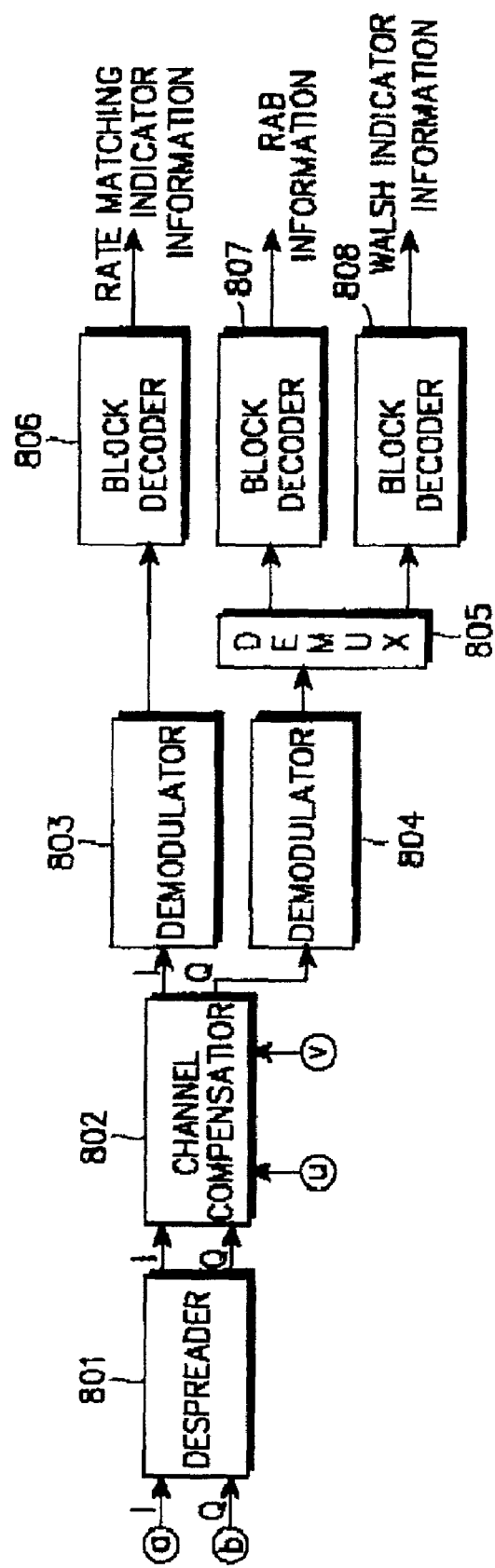
FIG. 8 illustrates a structure of a forward link receiver for a data traffic MAC channel according to an embodiment of the present invention.

FIG. 8 illustrates a structure of a forward link receiver for a data traffic MAC channel according to an embodiment of the present invention. An I channel of the data traffic MAC channel is used as a QoS matching indication channel, while a Q-channel of the data traffic MAC channel is used as a Walsh space indication subchannel and a reverse activity indication subchannel. In each slot, the Walsh spaced indication subchannel and the reverse activity indication subchannel have a 1,280-chip period and a 256-chip period, respectively. The Walsh spaced indication subchannel and the reverse activity indication subchannel are multiplexed on a time division basis, thus to share the data traffic MAC channel.

A process for demodulating a data traffic MAC channel signal received at the receiver will be described with reference to FIG. 8. In FIG. 8, an I channel, i.e., the QoS matching indication channel, of the data traffic MAC channel will be represented by 'a', and a Q-channel, i.e., the Walsh space indication subchannel and the reverse activity indication subchannel, of the data traffic MAC channel will be represented by 'b'. The received data traffic MAC channel is provided to a Walsh despreader 801. The Walsh despreader 801 despreads the received data traffic MAC channel with a Walsh code allocated to the QoS matching indication channel. A channel compensator 802 performs channel compensation on the output signal of the Walsh despreader 801 using the channel information estimated in FIG. 6, and provides the I-channel component and the Q-channel component of the channel-compensated signal to a demodulator 803 and a demodulator 804, respectively.

Here, the "estimated channel information" refers to the I-channel component and the Q-channel component output from the channel estimator 606 shown in FIG. 6. In FIGS. 6 to 8, the I-channel component from the channel estimator 606 is represented by 'u' and the Q-channel component is represented by 'v'. The demodulator 803 BPSK-demodulates the I-channel component output from the channel compensator 802 and provides its output signal to a block decoder 806. Here, the I-channel signal demodulated by the demodulator 803 is a QoS matching indication channel signal. The block decoder 806 block-decodes the I-channel signal output from the demodulator 803, thereby restoring the QoS matching indication channel information.

Meanwhile, the demodulator 804 BPSK-demodulates the Q-channel component output from the channel compensator 802 and provides its output signal to a demultiplexer 805. The demultiplexer 805 demultiplexes the output signal of the demodulator 804 into a reverse activity indication subchannel signal and a Walsh space indication subchannel signal, and provides the reverse activity indication subchannel signal to a block decoder 807 and the Walsh space indication subchannel signal to a block decoder 808. The block decoder 807 block-decodes the reverse activity indication subchannel signal provided from the demultiplexer 805, thereby restoring the reverse activity indication subchannel information. Further, the block decoder 808 block-decodes the Walsh space indication subchannel signal provided from the demultiplexer 805, thereby restoring the Walsh space indication subchannel information.

Figure 9:
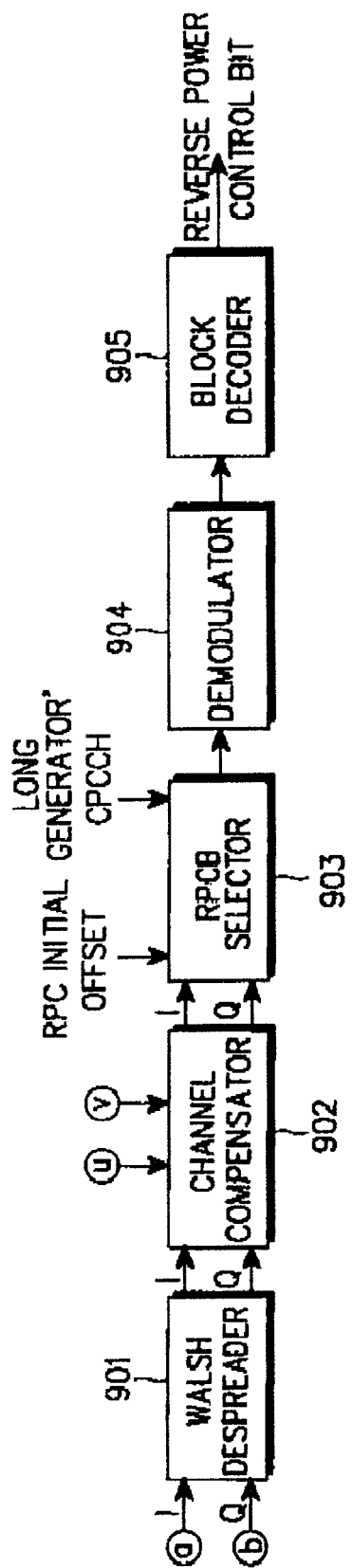
FIG. 9 illustrates a structure of a forward link receiver for a common power control channel (CPCCH) according to an embodiment of the present invention.

FIG. 9 illustrates a structure of a forward link receiver for a common power control channel (CPCCH) according to an embodiment of the present invention. More specifically, FIG. 9 illustrates a structure of a receiver for decoding common power control channel (CPCCH) information for controlling transmission power of a physical channel for a data service operating in the circuit mode in the reverse link.

In the following description, it will be assumed that a received signal is converted to a baseband signal, and the I-channel signal of the baseband signal is represented by 'a' and the Q-channel signal of the baseband signal is represented by 'b'. A Walsh despreader 901 despreads the baseband signal with a Walsh code allocated to the common power control channel (CPCCH). A channel compensator 902 performs channel compensation on the output signal of the Walsh despreader 901 using the channel information estimated in FIG. 6, and provides the channel-compensated signal to an RPCB (Reverse Power Control Bit) selector 903. Here, the "estimated channel information" refers to the I-channel component and the Q-channel component output from the channel estimator 606 shown in FIG. 6. In FIGS. 6 to 9, the I-channel component from the channel estimator 606 is represented by 'u' and the Q-channel component is represented by 'v'.

The RPCB selector 903 selects a reverse power control bit (RPCB) from the output signal of the channel compensator 902, and provides the selected reverse power control bit to a demodulator 904. More specifically, a reverse power control bit to be used in a specific mobile station exists in a unique position of a signal that was subject to channel compensation after despreading. This position is determined by an initial offset allocated to the specific mobile station and a relative offset determined by a long code for the CPCCH every 1.25 msec. The RPCB selector 903 then selects the RPCB distributed in the I channel or the Q channel of the received signal using the long code generated every 1.25 msec from the long code generator and the initial offset value allocated to the mobile station. The signal selected by the RPCB selector 903 is BPSK-demodulated by the demodulator 904, and then provided to a block decoder 905. The block decoder 905 performs block decoding on the output signal of the demodulator 904, thus restoring the reverse power control bit information.

The above-stated forward data traffic channel (packet data channel) can be shared by a plurality of users on a time division basis, since its transmission time does not continue on the radio channel. However, when a circuit data (voice and data) user (hereinafter, referred to as a "voice user") coexists, channel allocation of the voice user is performed independently of the channel occupation time of the packet data user. Although a data rate on the radio link of the packet data is physically limited by a carrier-to-interference ratio (CIR) of the packet data, an orthogonal (Walsh) code allocated to the packet user must be different from the orthogonal code allocated to the currently connected voice user in light of the characteristic of the orthogonal code. Therefore, the available data rate is limited again according to the number of the orthogonal codes available for transmission of the packet data.

Therefore, in the mobile communication system where the voice user and the packet user coexist, the maximum data rate of the packet data becomes more efficient in light of the physical channel characteristics of the available orthogonal codes and the transmission channels. For reference, in the current CDMA mobile communication system, every user accesses the system on a code division multiplying (CDM) basis, and a period of orthogonal code allocation to the packet channel is identical to a period of orthogonal code allocation to the voice channel. A principle of the present invention, aimed at increasing efficiency by determining the maximum data rate of the packet data considering all of the physical channel characteristics of the available orthogonal codes and the transmission channels, will be described with reference to FIG. 10.

Figure 10:
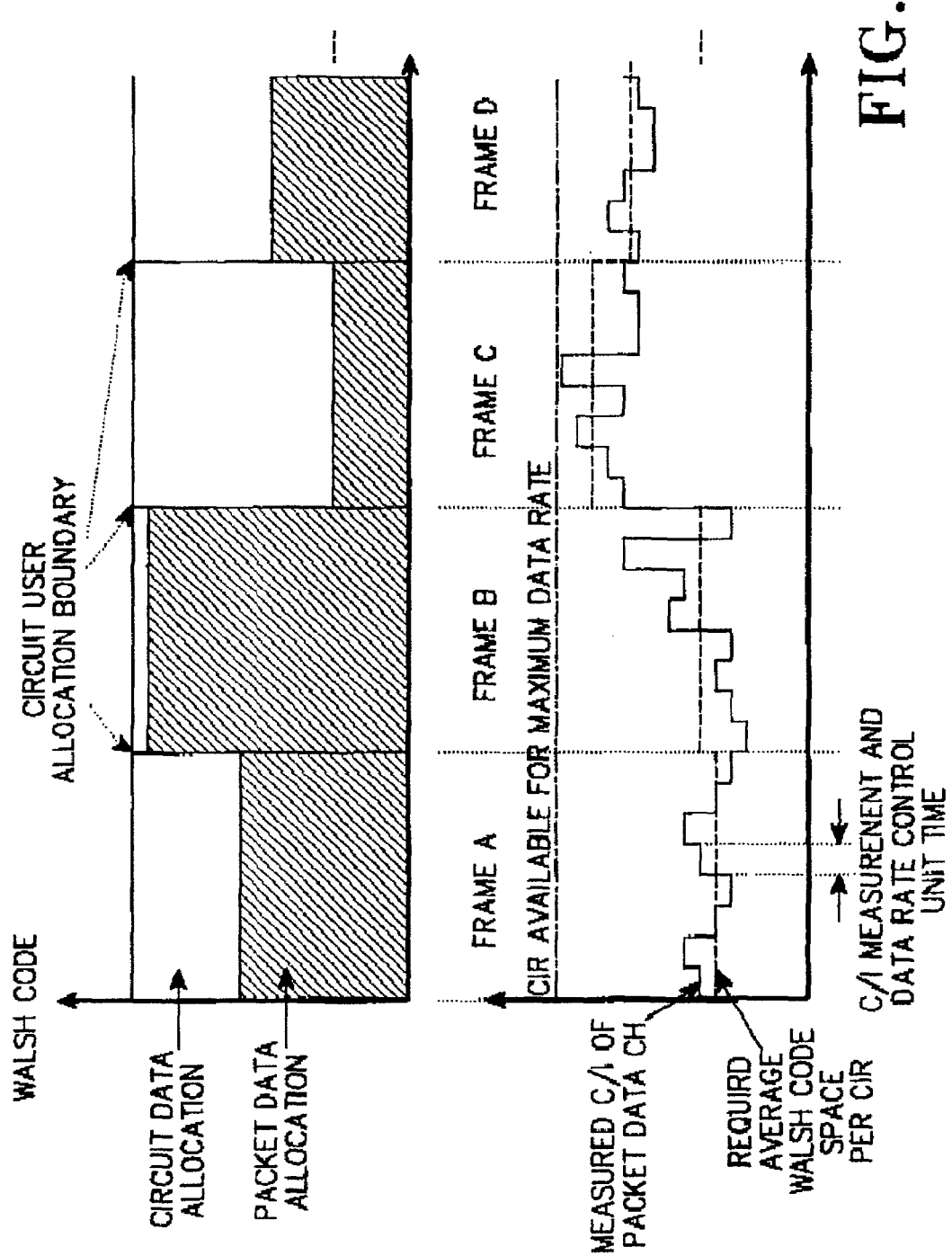
FIG. 10 illustrates a relationship between a carrier-to-interference ratio (CIR) of a packet channel and distribution of orthogonal codes to a voice user and a packet user in a mobile communication system to which the present invention is applied.

FIG. 10 illustrates a relationship between a carrier-to-interference ratio (CIR) of a packet channel and distribution of orthogonal codes to a voice user and a packet user in a mobile communication system to which the present invention is applied. That is, FIG. 10 illustrates a relationship between the CIR of the packet channel, measured by the mobile station, and orthogonal codes allocated to the packet user connecting with the forward link on a time division basis and the voice user connecting with the forward link on a code division basis. Since a Walsh code is typically used for the orthogonal code, it should be noted herein that a Walsh code is used instead of the orthogonal code.

Referring to FIG. 10, the packet data, in light of its characteristic, is transmitted in a short period of time, and a plurality of packet users access the base station on a time division basis. Unlike this, the voice user accesses the base station independently of the packet user at a frame boundary point having a specific period, and is allocated an orthogonal code to perform a call. A change in the number of orthogonal codes allocated to the voice user causes a change in the number of the orthogonal codes available for transmission of the packet data. In FIG. 10, the hatched parts illustrate that the number of the orthogonal codes available for transmission of the packet data is changed according to the change in the number of the orthogonal codes allocated to the voice user. Regardless of the number of the orthogonal codes available for the forward link, the mobile station can measure CIR of the packet data channel in a unit of a time less than one frame or in a unit of an independent time, and determine a physically available maximum data rate of the packet data based on the measured CIR. An orthogonal code required for data transmission is proportional to the data rate in light of its characteristic. In a period of a frame A, the number of the orthogonal codes required for transmitting the data at the maximum average data rate determined based on the CIR is almost identical to the number of the orthogonal codes available for the packet data. In a period of frame B, the number of the required orthogonal codes is less than the number of the currently available orthogonal codes, so there is no difficulty in transmitting the packet data at the maximum data rate determined based on the CIR. In the frame A period and the frame B period, there are sufficient orthogonal codes allocable for the packet data. However, in a frame C period and a frame D period, although the CIR is high enough, the number of the orthogonal codes available for the packet data is insufficient, so it is not possible to transmit the packet data at the physically available maximum data rate based on the CIR. That is, it could be understood that the data rate of the forward link packet data should be determined on condition that both the CIR value and the number of the required orthogonal codes are satisfied.

As illustrated in FIG. 2, a data transmission physical link of a mobile communication system performs forward error correction coding, symbol repetition, QPSK/QAM modulation/mapping and demultiplexing on the packet data bits provided from the upper layer, and also performs modulation such as spreading using an orthogonal code. In the modulation process, various parameters such as a coding rate, a repetition rate, a symbol mapping method and the number of multiplexed outputs, are determined according to the number of the available orthogonal codes and the data rate of the packet data determined according to the same. In the invention, the mobile station determines the data rate of the packet data considering both the number of the available orthogonal codes and the CIR measured by the mobile station in a state where the number of the orthogonal codes available for transmission of the packet data continuously varies according to the number of the voice users, and then, determines the modulation/demodulation parameters according to the determined data rate.

Before specifically describing a data rate control operation according to an embodiment of the present invention, the technical terms to be used in the following description will be defined in Table 2.

TABLE 2

Rm: Maximum available data rate determined based on measured CIR
Nw: Number of available orthogonal codes except orthogonal codes for voice users
Nm: Maximum number of available orthogonal codes in the absence of voice users
r: Sequence repetition rate, sequence repetition number in Ns slots per packet.
Ns: Number of slots per packet.
p: Packet symbol size after I/Q demultiplexing (for I-arm or Q-arm each)
c: Total number of chips per Packet (for I-arm or Q-arm each)
b: Total number of bits per packet before QPSK/QAM mapping (before I/Q branching)

In Table 2, the maximum available data rate Rm is determined when all of the Walsh codes are used, and is represented by a data rate (DR) table of Table 3 illustrated below.

Figure 11:
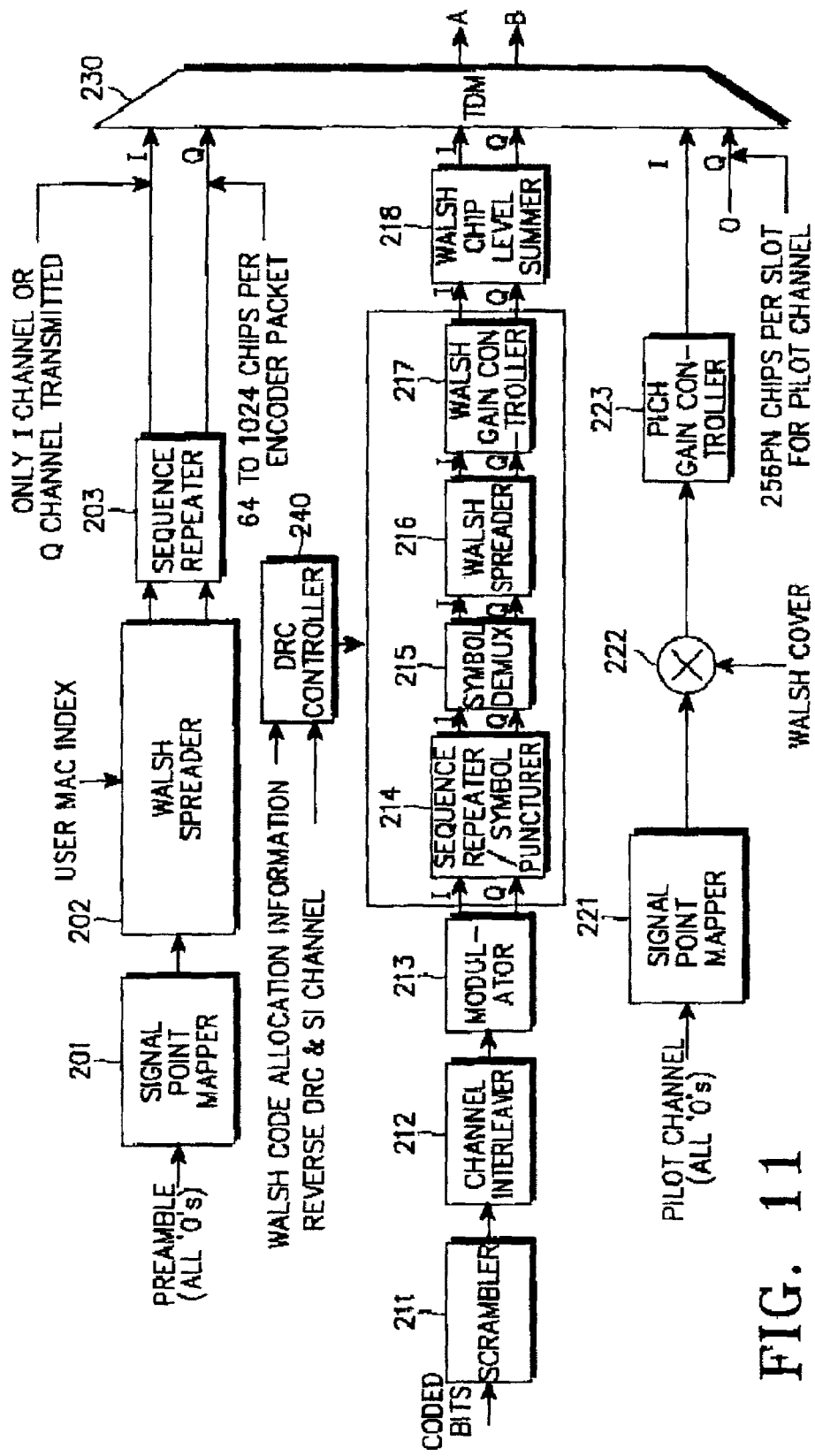
FIG. 11 illustrates a structure of a forward link transmitter for a data traffic channel having a data rate control function according to an embodiment of the present invention.

FIG. 11 illustrates a structure of a forward link transmitter for a data traffic channel having a data rate control function according to an embodiment of the present invention. This transmitter is constructed based on the structure of the transmitter illustrated in FIG. 2. Thus, a description of the transmitter will be limited to the elements related to an operation of controlling the data rate.

Referring to FIG. 11, packet data having a specific length, provided from a MAC layer, is subjected to turbo coding for forward error correction and channel interleaving, and then subjected to symbol mapping (or modulation) such as QPSK/8PSK/16QAM according to its data rate. The data subjected to the symbol mapping is demultiplexed into a first-channel (I-channel) symbol and a second-channel (Q-channel) symbol by a 1-to-2 demultiplexer 215. The I-channel symbol and the Q-channel symbol are spread with a 32-ary Walsh code by a Walsh spreader 216, which can be implemented by a 1-to-Nw demultiplexer. This process is performed in a period of time corresponding to a predetermined number of slots. Thus, even after the symbols constituting one packet are completely transmitted, the symbol repetition is performed. In this case, the repetition rate is equal to or larger than '1' for the low data rate, and approaches '1' for the high data rate. In this modulation process, the parameters (the number of output nodes of the demultiplexer 215 before Walsh spreading, a repetition rate, and the number of slots required for transmitting one packet) are varied according to the number of the available Walsh codes. A DRC (Data Rate Control) controller 240 receives Walsh code allocation information (i.e., information on Walsh codes allocated to its base station), DRC information and 30 selector indicator (SI) information from the mobile station, and controls the above-stated parameters according to a data rate control operation proposed by the invention. The features and advantages of the DRC control operation according to an embodiment of the present invention by the forward link transmitter will become more apparent from the following detailed description.

Referring back to FIG. 1A, one slot of the packet data channel is comprised of two 128-chip burst pilot subchannels, a preamble, a length of which is variable according to a data rate, and packet data. One data packet is transmitted over one or more than one slots, and the preamble is located just in front of a position where one data packet is transmitted, and a length of the preamble is variable according to the data rate.

Table 3 shows numerical values indicating modulation parameters and a packet structure for respective data rates of the packet data channel, when a total of 28 orthogonal codes (Walsh codes) available for the packet data can all be used. For example, if a data rate (DR) index is 6, one packet 'c' is comprised of 768 bits, and after the packet is subjected to ⅓ coding, QPSK symbol mapping and symbol demultiplexing, the total number 'f' of the symbols in one physical layer packet (PLP), to be transmitted, is 1152. The 1152 symbols are transmitted for a time of one slot, and since only 28 of the total space of the Walsh codes of length 32 can be used, the number 'k' of available data modulation symbols is 1064. This is because the number 'k' of available data modulation symbols is determined by multiplying the number 'i' of available data chips per packet by an available Walsh ratio 'j', and the number 'i' of available data chips per packet is determined by subtracting the number 'g' of preamble symbols and the number 'h' of pilot chips per packet from a value obtained by multiplying the number 'b' of slots per packet by 1536, the number of chips per slot. That is, if the data rate index is 6 where a data rate is 614.4 kbps, the number (1064) of available data modulation symbols is determined by multiplying the number (1216) of the available data chips per packet by the available Walsh ratio (28/32), and the number (1216) of available data chips per packet is determined by subtracting the number (64) of preamble symbols and the number (256) of pilot chips per packet from a value obtained by multiplying the number (1) of slots per packet by the number (1536) of chips per slot. Therefore, some (1152−1064=88 symbols) of the 1152 symbols to be transmitted per packet are punctured before transmission. The last column 'l' of Table 3 indicates the number of transmissions repeated for a time of given slots 'b'. The repetition number 'l' is determined by dividing the number 'k' of available data modulation symbols by the number 'f' of symbols of the physical layer packet, to be transmitted. A parameter 'm' indicates a CIR value required in applying a modulation mode indicated by the corresponding data rate index and a coding rate to 28 Walsh codes. The value 'm' can be properly calculated through a field test at every data rate. A parameter 'n' is a CIR value required when applying a modulation mode indicated by the corresponding data rate index and a coding rate to one Walsh code. The value 'n' is determined by dividing the value 'm' by 28, the maximum number of available Walsh codes.

Referring back to FIG. 3 illustrating a structure of a forward MAC channel including a forward Walsh indication channel indicating orthogonal code allocation information of the base station, information on the orthogonal code allocated for the packet user must be transmitted to the mobile station at least two slots before transmission of the packet data is started. In the embodiment of the present invention, since the packet data symbol is spread with Walsh codes having a length of 32 chips, use/nonuse of the respective Walsh codes W0–W31 is indicated on the basis of the Walsh codes having the length of 32 chips. In the embodiment of the present invention, it will be assumed that the remaining Walsh codes W4–W31 excepting the Walsh codes W0–W3 allocated for common signaling of the overall mobile communication system can be used by the voice or packet user.

Figure 14:
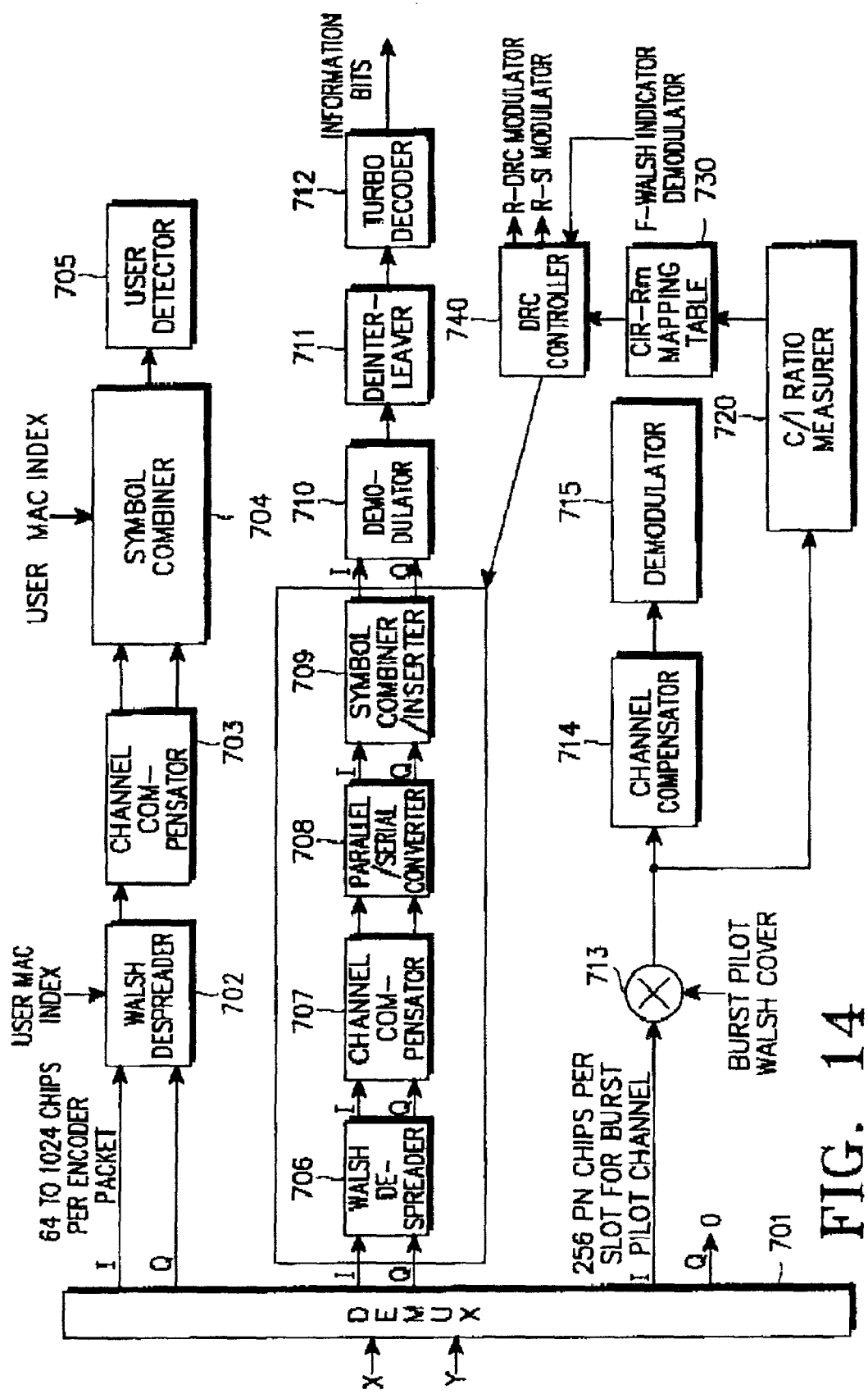
FIG. 14 illustrates a structure of a forward link for a data traffic channel having a data rate control function according to an embodiment of the present invention.

FIG. 14 illustrates a structure of a forward link for a data traffic channel having a data rate control function according to an embodiment of the present invention. This forward link

TABLE 3

Basic Data Rate (DR) Table

| DR Index | 'a' Data rates (kpbs) | 'b' Slots per Packet | 'c' Bits in Physical Layer Packet | 'd' Coding rate | 'e' Quad-Symbol Mapping | 'f' symbols/ I or Q arm per packet | 'g' Pre-amble Symbols | 'h' Pilot Chips per packet | 'i' Available Data Chips per packet (b'b'*1536 − 'g' − 'h') | 'j' Available Walsh Ratio (Nw = 28 = Nm) | 'k' Available Data Modulation Symbols ('i'*'j') | 'l' Repetition number (r) ('k'/'f') | 'm' Required CIR | 'n' Required CIR per Walsh code |
|---|---|---|---|---|---|---|---|---|---|---|---|---|---|---|
| 1 | 19.2 | 32 | 768 | 1/6 | QPSK | 2304 | 1024 | 8192 | 39936 | 28/32 | 34944 | 15.17 | A | A/28 |
| 2 | 38.4 | 16 | 768 | 1/6 | QPSK | 2304 | 1024 | 4096 | 19456 | 28/32 | 17024 | 7.39 | B | B/28 |
| 3 | 76.8 | 8 | 768 | 1/6 | QPSK | 2304 | 512 | 2048 | 9728 | 28/32 | 8512 | 3.69 | C | C/28 |
| 4 | 153.6 | 4 | 768 | 1/6 | QPSK | 2304 | 256 | 1024 | 4864 | 28/32 | 4256 | 1.85 | D | D/28 |
| 5 | 307.2 | 2 | 768 | 1/6 | QPSK | 2304 | 128 | 512 | 2432 | 28/32 | 2128 | 0.93 | B | E/28 |
| 6 | 614.4 | 1 | 768 | 1/3 | QPSK | 1152 | 64 | 256 | 1216 | 28/32 | 1064 | 0.93 | F | F/28 |
| 7 | 307.2 | 4 | 1536 | 1/3 | QPSK | 2304 | 128 | 1024 | 4992 | 28/32 | 4368 | 1.90 | G | G/28 |
| 8 | 614.4 | 2 | 1536 | 1/3 | QPSK | 2304 | 64 | 512 | 2496 | 28/32 | 2184 | 0.95 | H | 11/28 |
| 9 | 1228.8 | 1 | 1536 | 2/3 | QPSK | 1152 | 64 | 256 | 1216 | 28/32 | 1064 | 0.93 | I | 1/28 |
| 10 | 921.6 | 2 | 2304 | 1/3 | 8PSK | 2304 | 64 | 512 | 2496 | 28/32 | 2184 | 0.95 | J | J/28 |
| 11 | 1843.2 | 1 | 2304 | 2/3 | 8PSK | 1152 | 64 | 256 | 1216 | 28/32 | 1064 | 0.93 | K | K/28 |
| 12 | 1228.8 | 2 | 2304 | 1/3 | 16QAM | 2304 | 64 | 512 | 2496 | 28/32 | 2184 | 0.95 | L | L/28 |
| 13 | 2457.6 | 1 | 2304 | 2/3 | 16QAM | 1152 | 64 | 256 | 1216 | 28/32 | 1064 | 0.93 | M | M/28 |

Figure 12:
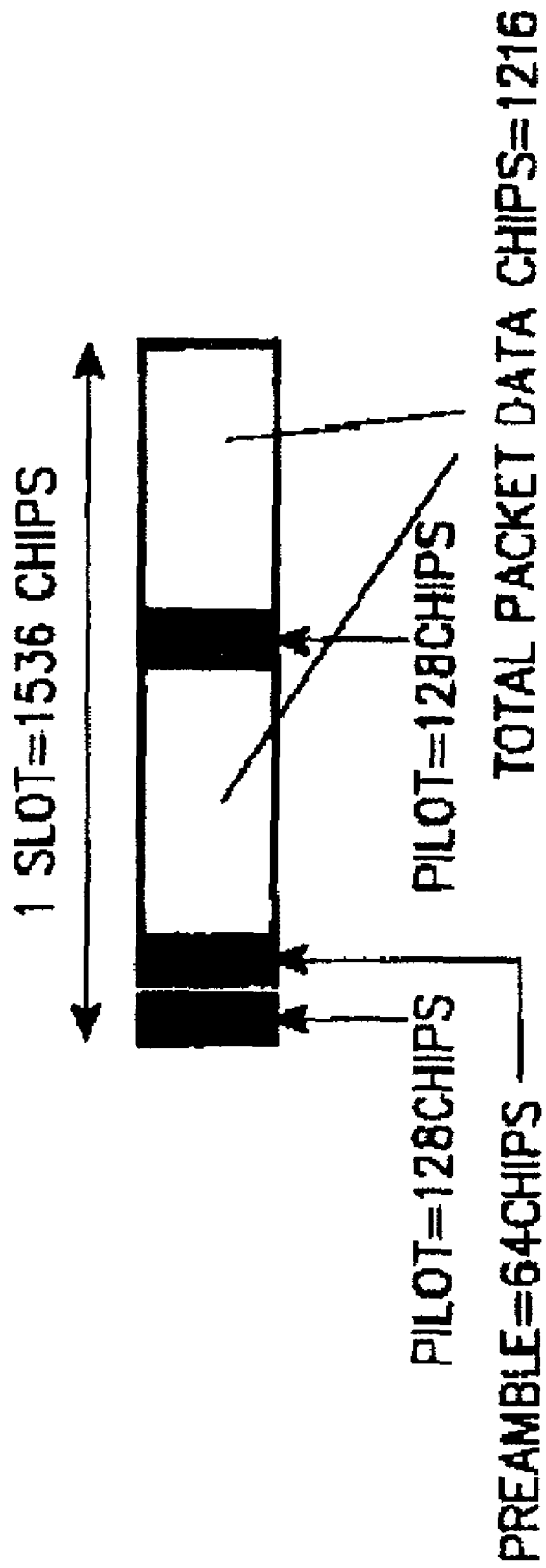
FIG. 12 illustrates a slot structure used when a forward link transmitter transmits a packet at a data rate of 614.4 kbps according to an embodiment of the present invention.

FIG. 12 illustrates a slot structure used when a forward link transmitter transmits a packet at a data rate of 614.4 kbps according to an embodiment of the present invention. This slot structure is used when the packet is transmitted at a data rate of 614.4 kbps (768 bits per 1 slot) corresponding to the DR index #6 of Table 3. Here, the transmission packet is comprised of 1536 chips per slot, the number of pilot chips per packet is 256 (=128+128), the number of preamble symbols is 64, and the number of available data chips per packet is 1216.

Figure 13:
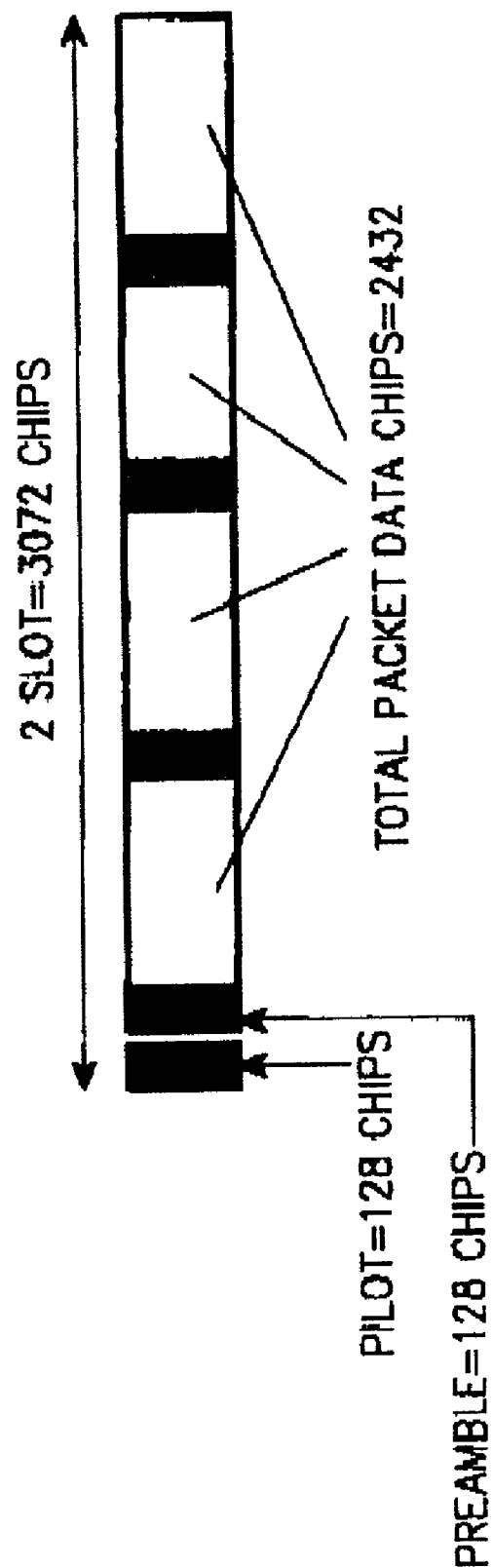
FIG. 13 illustrates a slot structure used when a forward link transmitter transmits a packet at a data rate of 307.2 kbps according to an embodiment of the present invention.

FIG. 13 illustrates a slot structure used when a forward link transmitter transmits a packet at a data rate of 307.2 kbps according to an embodiment of the present invention. This slot structure is used when the packet is transmitted at a data rate of 307.2 kbps (768 bits per 2 slots) corresponding to the DR index #5 of Table 3. In this case, the symbols of one packet are transmitted over 2 slots. Since repetition number given in the last column 'l' of Table 3 is 0.93, symbol repetition is performed almost once for 2 slots. Here, the transmission packet is comprised of 3072 (=2×1536) chips, the number of pilot chips per packet is 512 (=128×4), the number of preamble symbols is 128, and the number of available data chips per packet is 2432.

receiver (MS receiver) corresponds to the forward link transmitter (BS transmitter) having the data rate control function shown in FIG. 11, and is constructed based on the structure of the receiver shown in FIG. 7. Thus, a description of the receiver will be limited to the elements related to an operation of controlling the data rate.

Referring to FIG. 14, the forward link receiver performs a reverse operation of the modulation operation performed by the forward link transmitter. The forward link receiver performs Walsh despreading, parallel-to-serial multiplexing, symbol combining at a repetition rate, demapping (demodulation), and decoding. In the demodulation process, the parameters (the number of output nodes of a multiplexer, the number of symbol combinations and the number of slots required to transmit one packet, following Walsh demultiplexing) are changed according to the number of available Walsh codes.

The forward link receiver includes a DRC controller 740 for performing a DRC control operation according to an embodiment of the present invention. The DRC controller 740 determines the above-stated parameters to be used by a Walsh despreader 706, a channel compensator 707, a parallel/serial converter 708 and a symbol combiner 709 of the demodulator. Unlike the DRC controller 240 of the forward link transmitter of FIG. 11, the DRC controller 740 determines the parameters using CIR of the packet channel, measured using the pilot signal. To this end, the forward link receiver includes a C/I measurer 720. Further, the forward link receiver includes a CIR-Rm mapping table 730. The features and advantages of the DRC control operation according to an embodiment of the present invention by the forward link receiver will become more apparent from the following detailed description.

Figure 15:
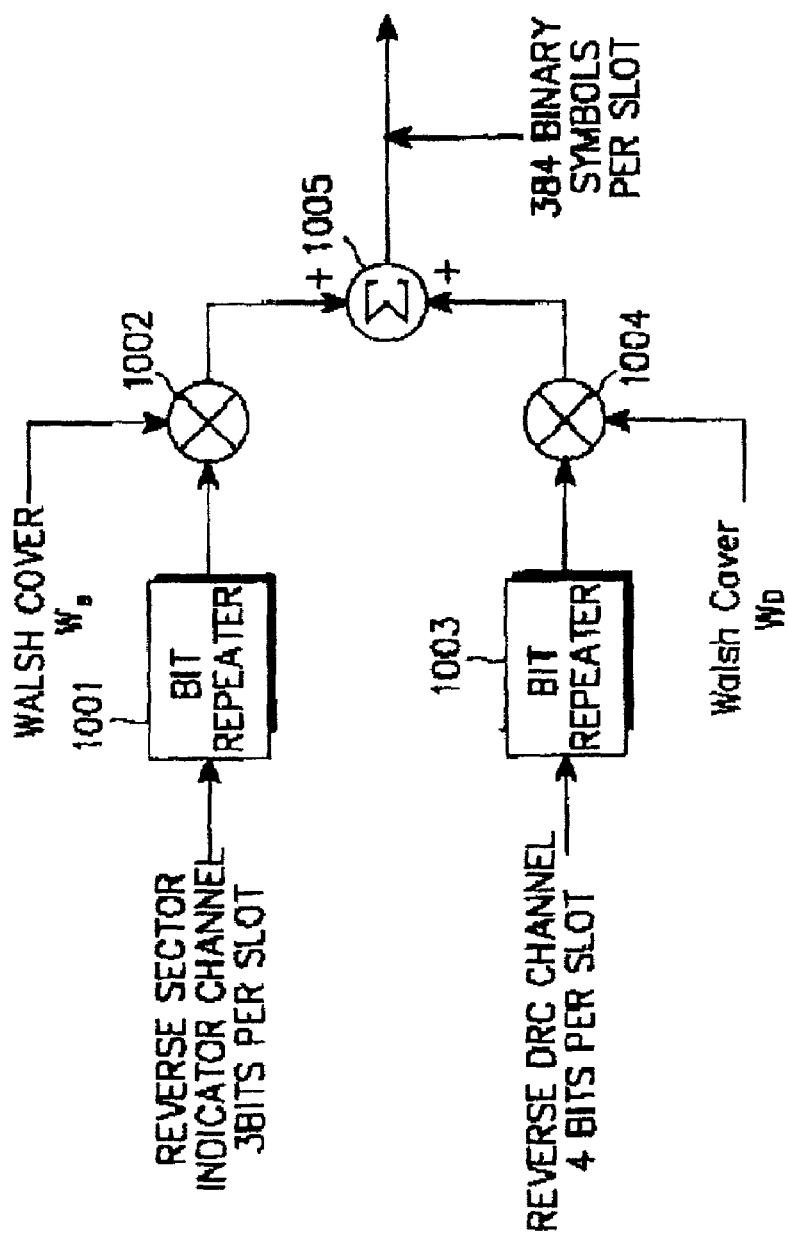
FIG. 15 illustrates a channel structure for transmitting DRC information and sector indicator information by a reverse link transmitter according to an embodiment of the present invention.

FIG. 15 illustrates a channel structure for transmitting DRC information and sector indicator information by a reverse link transmitter according to an embodiment of the present invention. In FIG. 15, a reverse DRC channel is a channel for transmitting information on a data rate determined by the mobile station to the base station. A reverse sector indicator channel is a channel used when the mobile station selects a base station supporting the highest data rate during a handoff. A bit repeater 1001 bit-repeats the sector indication channel information predetermined times. A spreader 1002 spreads the output of the bit repeater 1001 with a Walsh code $W_s$. A bit repeater 1003 bit-repeats the DRC channel information predetermined times. A spreader 1004 spreads the output of the bit repeater 1003 with a Walsh code $W_D$. A summer 1005 sums the output of the spreader 1002 and the output of the spreader 1004. For example, the sector indicator channel information can be comprised of 3 bits per slot, while the DRC channel information can be comprised of 4 bits per slot. Further, the output of the summer 1005 can be comprised of 384 binary symbols per slot.

Turning back to Table 3, the basic DR table is created based on the case where the Nm=28 Walsh codes excepting the 4 Walsh codes previously allocated to the common channel for the voice user among the Walsh codes of length 32. However, when the number Nw of available Walsh codes is less than Nm, the number of output nodes of the demultiplexer 215 shown in FIG. 11 is limited to below Nm, so it is not possible to transmit all the symbols of one packet in a period of Ns slots. If it is desired to transmit 768 bits at a data rate of 614.4 kbps at a DR index #5 of Table 3 and the number of orthogonal codes allocated for the packet data in the current base station is not 28 but 14, the number of data modulation symbols in one slot is reduced to 1064/(14/28) =532. Therefore, it is necessary to change the modulation/demodulation parameters, for example, by increasing the total number of slots required for transmitting one packet or decreasing the number of packet symbols. As a result, if Nw<Nm, the modulation/demodulation parameters (r, p, Ns, code rate, and a coded symbol mapping method) can be changed in order to transmit all the symbols of one packet at least one time. However, since the code rate and the coded symbol mapping method are determined according to the maximum available data rate directly reflecting the CIR characteristic of the radio transmission channel, it is not preferable that they are changed according to Nw.

As illustrated in FIG. 14, the mobile station according to the present invention includes the DRC controller 740 having a function of decreasing (or down-controlling) the modulation/demodulation parameters (of n, Ns and p) determined at the maximum available data rate Rm based on the CIR, considering the number Nw of the available orthogonal codes. It should be noted that the DRC controller 240 of FIG. 11, being similar in structure to the DRC controller 740 included in the mobile station, can be included in the BS transmitter to operate the modulator, or the demodulation parameters determined in the mobile station can be transmitted over the reverse channel and used as modulation parameters.

Figure 16:
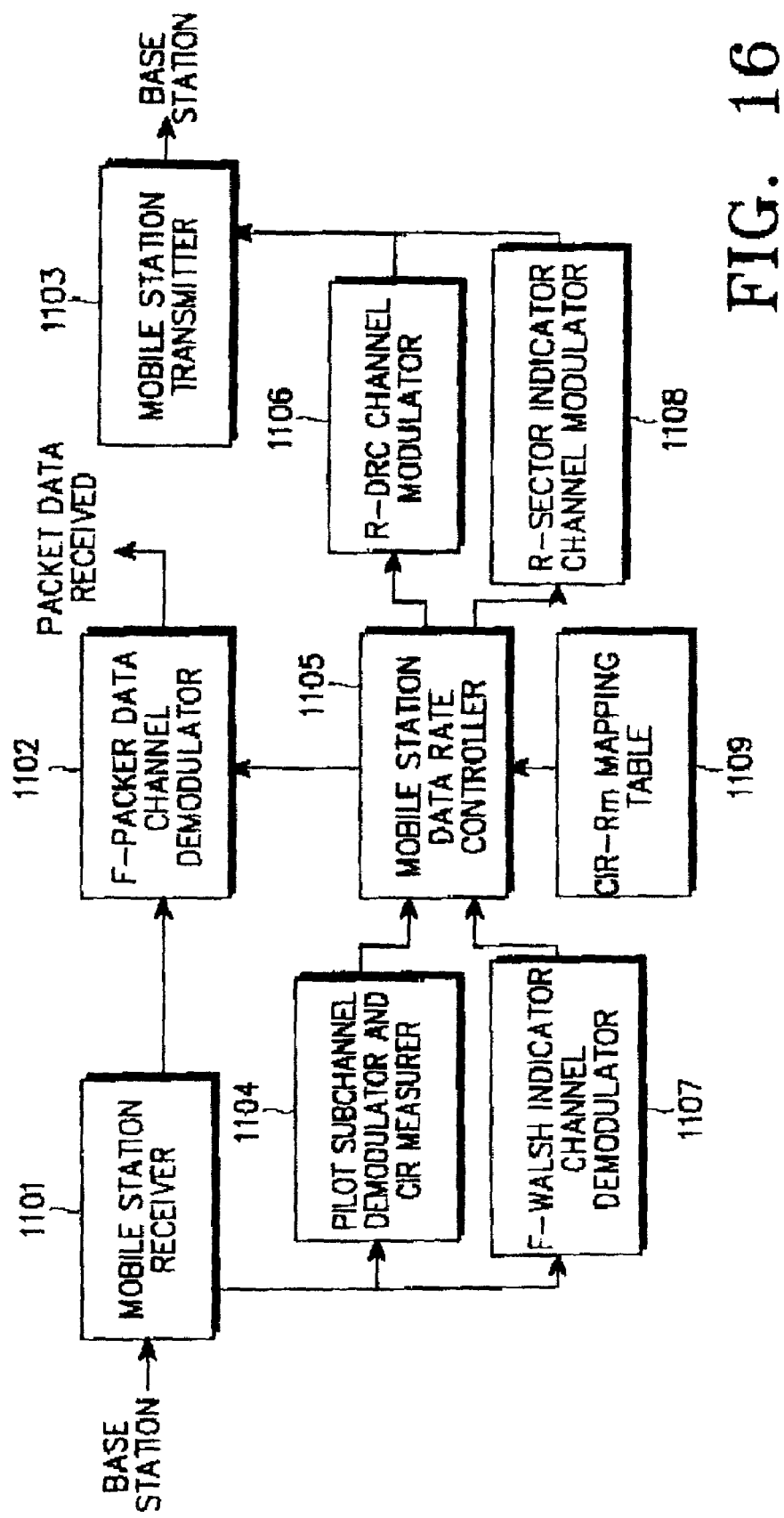
FIG. 16 illustrates a structure of a scheme for performing a data rate control operation according to an embodiment of the present invention.

FIG. 16 illustrates a structure of a scheme for performing a data rate control operation according to an embodiment of the present invention. Referring to FIG. 16, a mobile station (MS) receiver 1101 receives an RF signal from a base station (BS), and converts the received RF signal to an IF (Intermediate Frequency) signal. The MS receiver 1101 corresponds to the elements shown in FIG. 6. A packet data channel demodulator 1102 demodulates packet data transmitted from the base station. The packet data channel demodulator 1102 corresponds to the elements 706–712 illustrated in FIG. 14. A pilot subchannel demodulator & CIR measurer 1104 receives a forward pilot channel signal and then measures CIR from the received forward pilot channel signal. The pilot subchannel demodulator corresponds to the elements 713–715 of FIG. 14. A Walsh indicator channel demodulator 1107 demodulates a received forward Walsh indication channel signal indicating BS Walsh code allocation information of a previous frame (e.g., 20 ms frame). The Walsh indicator channel demodulator 1107 corresponds to the elements 801, 802, 804, 805 and 808. A CIR-Rm mapping table 1109 maps the CIR measured by the CIR measurer 1104 with a data rate available when the maximum number (e.g., 28) of Walsh codes are used. The CIR-RM mapping table 1109 is identical to the CIR-Rm mapping table 730 of FIG. 14, and can be constructed in the form of a look-up table. An MS data rate controller 1105 selects a base station capable of transmitting data at the maximum data rate, using the previously transmitted Walsh code allocation information of the base station belonging to a received active set. The data rate controller 1105 is identical to the DRC controller 740 of FIG. 14. Further, the data rate controller 1105 transmits the DRC information of data rate control information and sector indicator of base station selection information to the base station over the reverse channel through a reverse DRC channel modulator 1106 and a reverse sector indicator channel modulator 1108, respectively. The reverse DRC channel modulator 1106 and the reverse sector indicator channel modulator 1108 are constructed as shown in FIG. 15. An MS transmitter 1103 converts the DRC information from the reverse DRC channel modulator 1106 and the sector indicator from the reverse sector indicator channel modulator 1108 to an RF signal proper to be transmitted, and then transmits the converted RF signal to the base station. The MS transmitter 1103 corresponds to the elements shown in FIG. 6. Further, the DRC controller 1105 calculates demodulation parameters of the packet channel considering both the Walsh code allocation information and the data rate corresponding to the CIR, and sets the demodulation parameters of the packet data channel demodulator 1102 at the demodulation point. An operation of calculating the demodulation parameters by the DRC controller 1105 will become more apparent from the following detailed description given with reference to FIG. 18.

Figure 17:
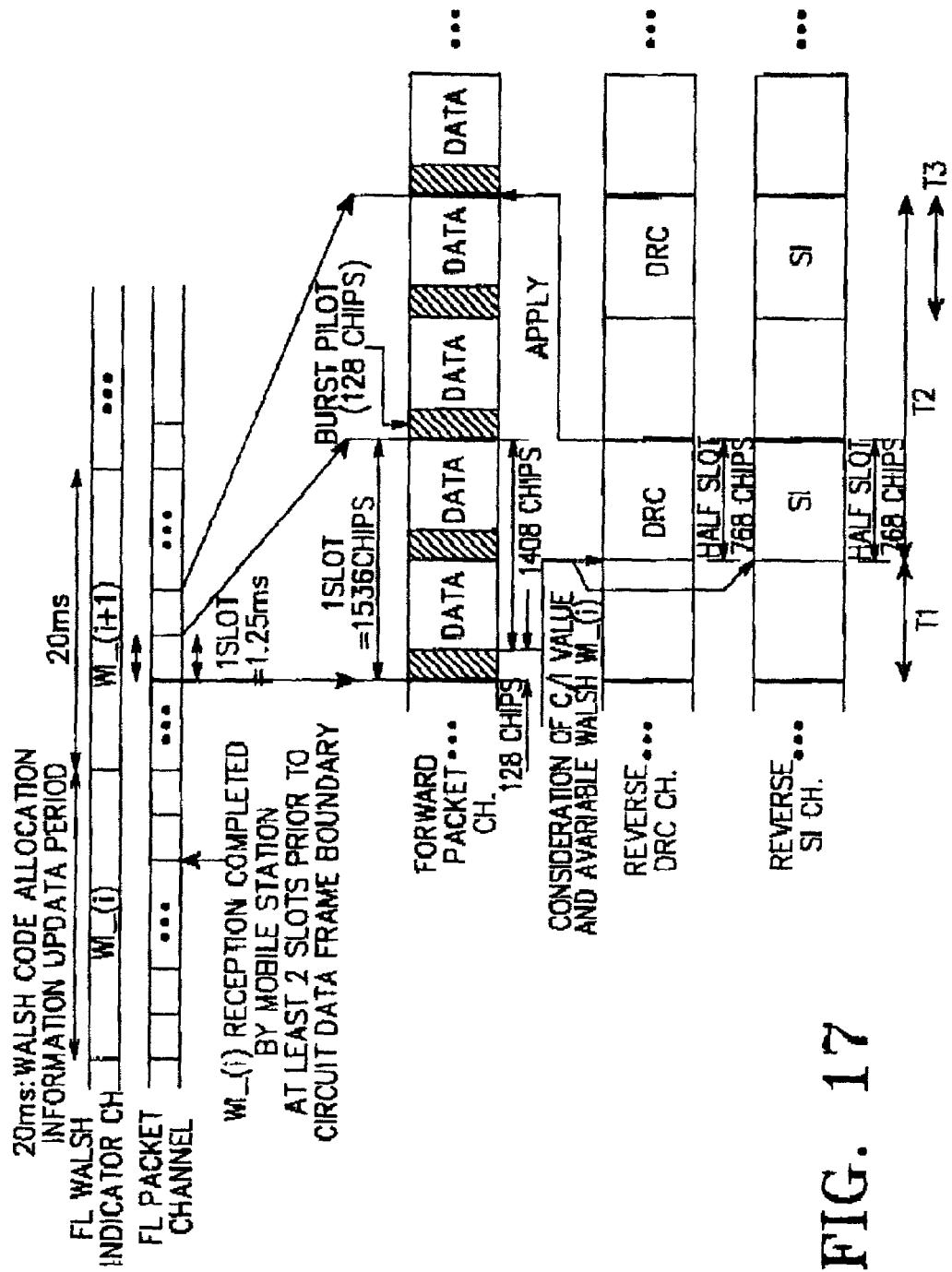
FIG. 17 illustrates operation timing among a forward Walsh indication channel, a forward pilot channel, a forward packet data channel and a reverse DRC channel during a data rate control operation according to an embodiment of the present invention.

FIG. 17 illustrates operation timing among a forward Walsh indication channel, a forward pilot channel, a forward packet data channel and a reverse DRC channel during a data rate control operation according to an embodiment of the present invention. Referring to FIG. 17, a voice data frame (e.g., 20 msec) has the same time length as 16 packet transmission slots (each having 1.25 msec). A data rate for a packet slot overlapping with a current frame time (i+1) is determined by receiving Walsh code allocation information transmitted over the forward Walsh indication channel (F-WICH) from an $i^{th}$ frame (previous frame) until an $(i+1)^{th}$ frame (current frame). As previously described in FIG. 14, the CIR is measured by calculating power of a pilot symbol from a forward burst pilot channel. In this case, a burst pilot symbol existing just ahead of a transmission start point of the reverse DRC information is used. A mapping value between the measured CIR value and the maximum available data rate Rm is separately calculated or determined through a field test, and then, stored in the CIR-Rm mapping table 1109 of FIG. 16. An operation of measuring the CIR and calculating the maximum available data rate Rm is completed within a T1 time (½ slot period). The reverse DRC information based on the maximum available data rate Rm is transmitted as an index value in a second half period of each slot. An index value of the DRC information can be applied beginning at the second forward slot following a slot for transmitting the DRC information, considering a transmission time of the radio channel and a processing delay time in the base station. If the mobile station exists in a handoff region and thus can simultaneously receive the packet data from the base stations having the high power level, the mobile station measures CIR values of the respective base stations and then transmits an index of a base station having the maximum available data rate over the reverse sector indicator channel in sync with the DRC information transmission start point, considering all the Walsh code allocation information of the respective base stations. After transmission of the reverse DRC (R-DRC) channel and the reverse sector indicator (R-SI) channel, for a T2 time (a second half period of one slot and a period of the next slot), demodulation parameters proper for an actual data rate are determined using the Walsh code allocation information of the base station and then an operation is performed accordingly.

Figure 18:
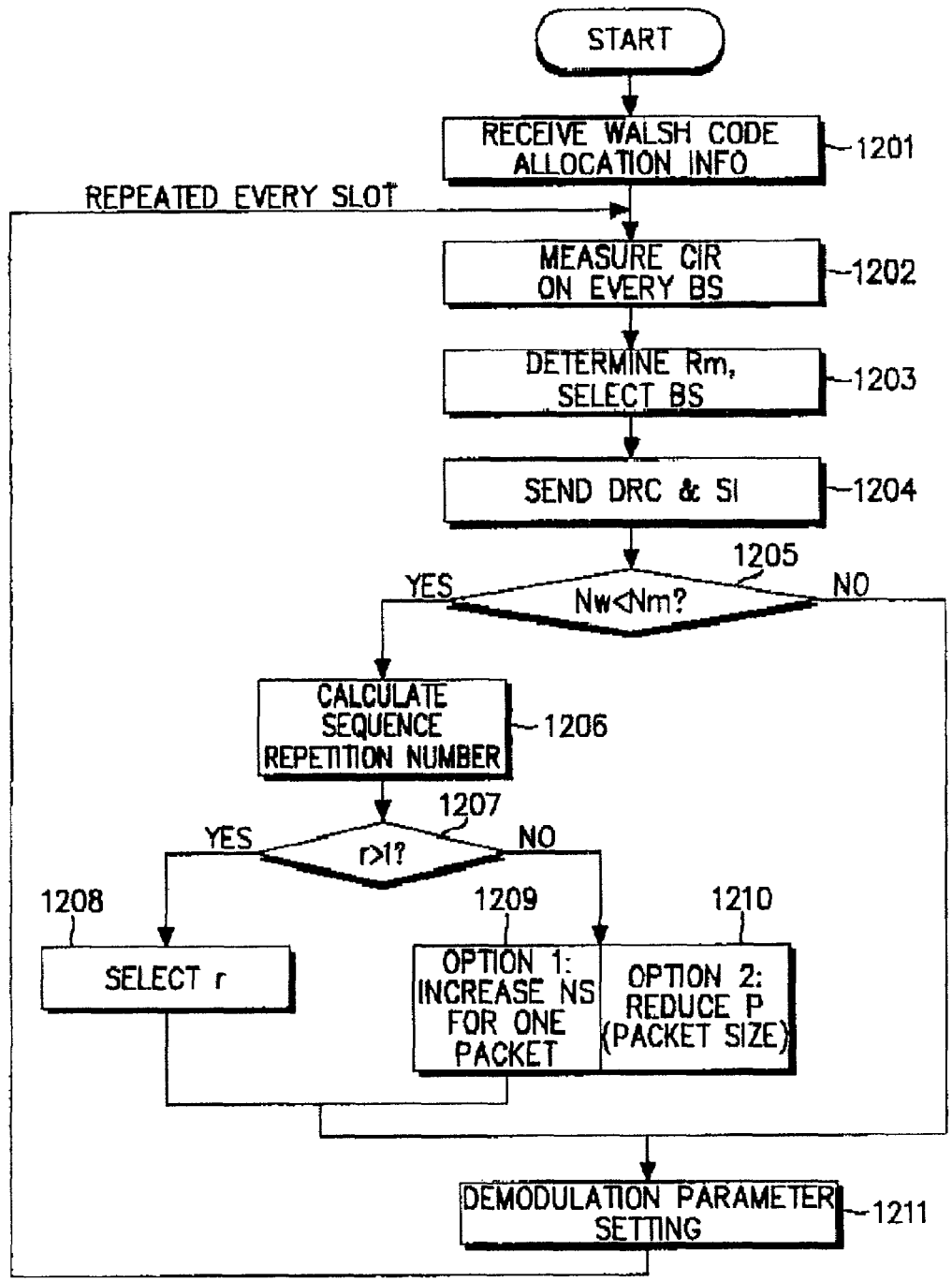
FIG. 18 is a flow chart illustrating a data rate determining operation by a mobile station according to an embodiment of the present invention.
Figure 20:
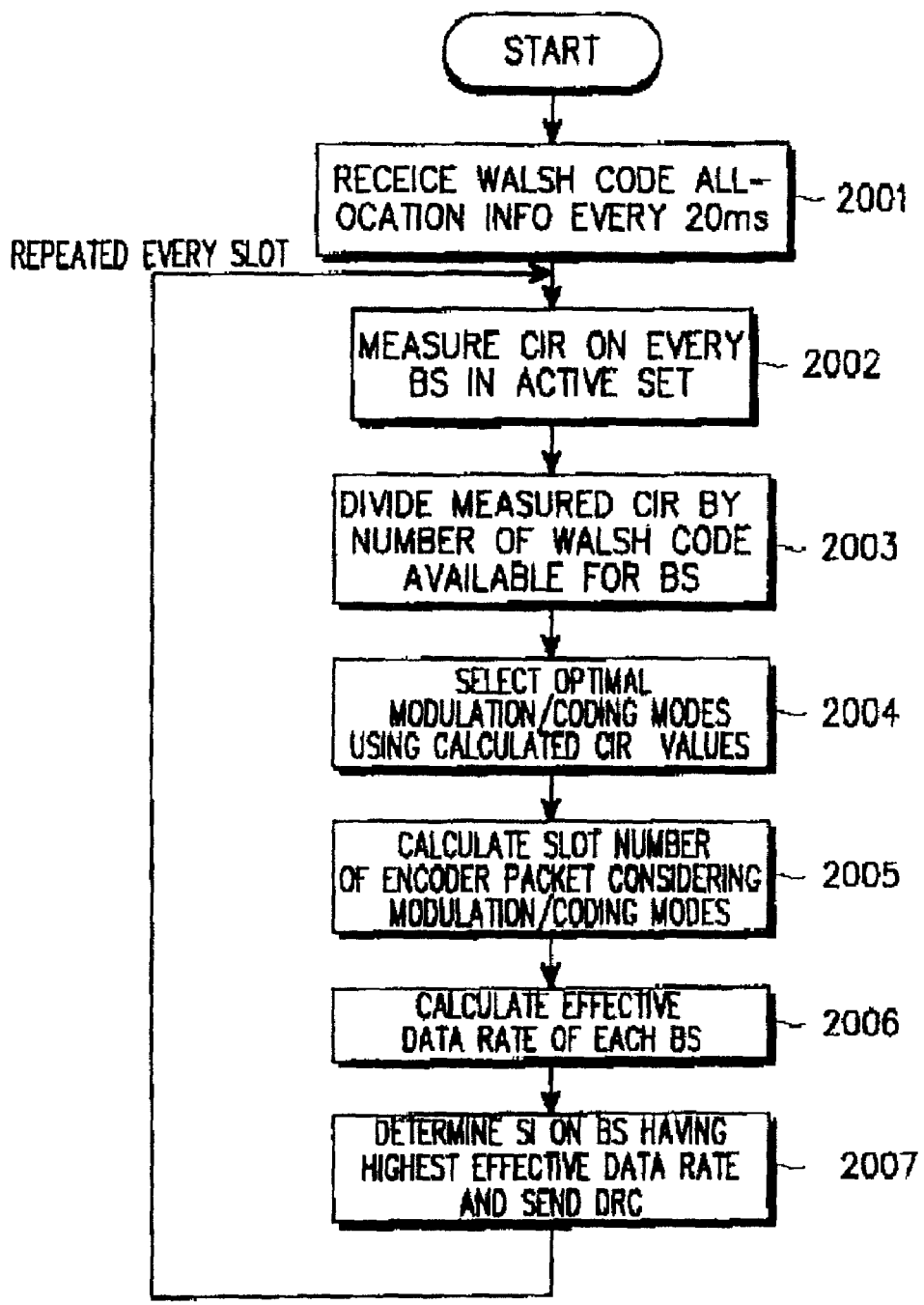
FIG. 20 is a flow chart illustrating an effective data rate determining operation by a mobile station according to an embodiment of the present invention.

Procedures based on algorithms for determining an actually effective data rate and demodulation parameters and then performing an operation according thereto are illustrated in FIGS. 18 and 20. Such procedures are performed on the assumption that the BS Walsh code allocation information received at the previous voice data frame is previously known before determination of the data rate at every slot. The base station performs the same operation as the DRC algorithm of the mobile station for a T3 time (a second half period of the next slot) according to the reverse sector indicator (R-SI) and the reverse data rate control (R-DRC) information received over the reverse link, thereby calculating the modulation parameters. The modulation/demodulation parameters (repetition rate, the number of slots, and the number of packet symbols) calculated in the mobile station and the base station are set (applied) to the packet channel transmitter of the base station and the packet channel receiver of the mobile station at the last point of the T3 time.

Embodiment #1

FIG. 18 is a flow chart illustrating a data rate determining operation by a mobile station according to an embodiment of the present invention. This flow chart can be divided into the following 7 processes.

<Process #1; steps 1201 and 1202>

The Walsh indicator channel demodulator 1107 of FIG. 16 demodulates Walsh code allocation information of the signals received by the receiver 1101 every 20 ms frame, a predetermined time unit. The CIR measurer 1104 measures CIR of the received packet channel from the forward burst pilot within the T1 time of FIG. 17.

<Process #2; steps 1203 and 1204>

When the mobile station is in a non-handoff region, the DRC controller 1105 determines a maximum data rate corresponding to the CIR measured by the CIR measurer 1104 using the CIR-Rm mapping table 1109, a previously calculate loop-up table, and transmits information on the determined maximum data rate to the base station over the reverse DRC channel. For example, the CIR-Rm mapping table 1109 can be constructed as a memory in the form of Table 3, for storing information on a plurality of data rates in association with a plurality of CIRs. Here, the "maximum data rate" refers to a data rate determined considering only the measured CIR, and in this case, the number of available orthogonal codes is maximized. However, since the number of orthogonal codes available for the packet data service is changed according to the number of the orthogonal codes allocated for the voice service as stated above, the embodiment of the present invention determines the data rate considering only the measured CIR but also the number of allocated orthogonal codes. That is, the invention controls the data rate determined in association with the CIR according to the number of the allocated orthogonal codes, thereby determining a controlled data rate.

However, if the mobile station exists in the handoff region, the DRC controller 1105 receives all of the CIRs of the pilot signals from the respective base stations, measured by the CIR measurer 1104, and selects the maximum data rates associated with the CIRs from the CIR-RM mapping table 1109. Next, the DRC controller 1105 multiplies each of the selected maximum data rates by a ratio (Nw/Nm) of the number Nw of available orthogonal codes to the maximum number Nm of available orthogonal codes. The DRC controller 1105 selects a base station having the maximum value as the result of multiplication, and then transmits the sector indicator (SI) and the DRC information to the selected base station. An operation of this process can be represented by, $$DR = f(CIR) \text{ from Look-up Table} \qquad \text{Equation (1)}$$

$$SI = [\text{Max } i | DR_i * Nw/Nm, i=0 \sim \text{sector}_{\_no}], \text{ where sector\_no denotes the number of active sets.}$$

In Equation (1), DR indicates a data rate, i indicates base stations registered in the active set, Nw indicates the number of available orthogonal codes, Nm indicates the maximum number of available orthogonal codes, and SI indicates a sector indicator indicating a base station having the maximum value as the result of multiplication.

<Process #3; step 1205>

The DRC controller 1105 determines whether Nw<Nm. If Nw<Nm, the following Process #4 is performed. Otherwise, if Nw=Nm, the DRC controller 1105 selects the modulation/demodulation parameters (r, Ns and p) from the CIR-RM mapping table 1109.

<Process #4; step 1206>

The DRC controller 1105 calculates a sequence repetition number 'r_new' in accordance with Equation (2).

$$r\_new = c * (Nw/Nm)/p \qquad \text{Equation (2)}$$

In Equation (2), p indicates the total number of symbols constituting one packet, Nw indicates the number of available orthogonal codes, 'Nm' indicates size of total Walsh codes and 'c' indicates total Chips of 'Nm' Walsh codes as defined in Table 2. The sequence repetition number calculated by Equation (2) is equivalent to the sequence repetition number '1', shown in Table 3, determined by dividing the number 'k' of available data modulation symbols by the number 'f' of data modulation symbols per packet.

<Process #5; Step 1207>

The DRC controller 1105 determines whether r_new>1*prune_rate, where prune $_{13}$ rate is set to a real number approaching '1'. If the r_new value calculated in <Process #4 > is below '1' but approaches '1', for example, if prune_rate=0.9, it means that more than 90% of one packet is transmitted once in Ns slots. If r_new>1*prune_rate, i.e., if the sequence repetition number is larger than a predetermined value, the DRC controller 1105 performs the following <Process #6-1>. However, if r_new≦1*prune_rate, the DRC controller 1105 performs the following <Process #6-2>.

<Process #6-1; step 1208>

The DRC controller 1105 determines (selects) a sequence combining number as the r_new (>1*prune_rate) calculated in <Process #4>. It means that the number of inputs of the symbol multiplexer 708 shown in FIG. 14 becomes Nw, and at this moment, the number 'p' of symbols per packet and the number Ns of slots required in transmitting one packet are maintained. That is, in step 1208, the DRC controller 1105 changes the value 'r' to the value 'r_new', and maintains the intact values Ns and p from the CIR-RM mapping table 1109.

<Process #6-2; steps 1209 and 1210>

If the sequence repetition number 'r_new' is less than '1*prune_rate', the DRC controller 1105 can select one of two options Option #1 and Option #2.

Option #1 (step 1209): In this option, the slot length (the number of slots) for transmitting one packet is increased. That is, the DRC controller 1105 increases the number Ns of slots required in transmitting one packet so that p symbols can be transmitted once, where p indicates the total number of symbols per packet. Since the symbols are continuously transmitted for the increased number of slots, the actual 'r' value has a range of 1<r<2. In this case, the number of symbols 'p' of the slots constituting one packet remains unchanged. When the number of orthogonal codes is not identical to Nw, the number of data chips required to transmit p symbols is calculated by Equation (3), and the number 'Ns_new' of slots required in transmitting one packet is calculated by adding the value calculated by Equation (3) to the number of chips required in transmitting a preamble and then dividing the added value by the chip number (1536−256=1280 chips, in the embodiment) obtained by excluding pilot symbols of one slot, as represented by Equation (4). The 'p' value is maintained as the intact 'p' value from the CIR-Rm mapping table 1109.

$$\text{Required Chips for Data} = p*32/Nw \quad \text{Equation (3)}$$

$$Ns\_new = \lceil (p*32/Nw + \text{Preamble chips})/1280 \rceil \quad \text{Equation (4)}$$

In Equations (3) and (4), p indicates the total number of symbols constituting one packet and Nw indicates the number of available orthogonal codes. Further, in Equation (4), ⌈a⌉ indicates the minimum integer among integers larger than or equal to a given value 'a'.

Option #2 (step 1210): In this option, the total number 'p' of packet symbols to be transmitted is decreased to transmit only some part of the symbols. That is, the symbols are transmitted as many as the number of available symbols in Ns slots, the available symbol number being transmitted with the given number of orthogonal codes. Here, the number 'p_new' of available symbols is calculated by Equation (5). In this case, since r=1, the symbols are transmitted only once and the Ns value is maintained as the intact Ns value from the CIR-Rm mapping table 1109.

$$p\_new = c*Nw/Nm \quad \text{Equation (5)}$$

In Equation (5), p indicates the total number of symbols constituting one packet, Nw indicates the number of available orthogonal codes, Nm indicates total Walsh code number, and c indicates coded symbols to be transmitted as defined in Table 2.

After repeating the operations of <Process #1 > to <Processes #6-1 and #6-2> on every base station included in the current active set, the DRC controller 1105 selects a base station capable of supporting the maximum data rate and then transmits the sector indicator to the selected base station.

<Process #7; step 1211>

The DRC controller 1105 sets (applies) the determined parameters (r, Ns and p) to the packet data channel demodulator 1102 of FIG. 16. The elements of the channel demodulator 1102 include the Walsh despreader 706, the channel compensator 707, the parallel/serial converter 708 and the sequence combiner 709, shown in FIG. 14.

The above-stated operation of determining by a mobile station a data rate for a packet data service in a mobile communication system including a base station and the mobile station provided with voice and packet data services from the base station, will be summarized below.

(Stage #1) The MS receiver 1101 of FIG. 16 receives Walsh code information indicating the number of Walsh codes allocated for the packet data service (step 1201).

(Stage #2) The CIR measurer 1104 measures CIR of a received pilot channel (step 1202).

(Stage #3) The DRC controller 1105 determines a data rate associated with the measured CIR (step 1203).

(Stage #4) The DRC controller 1105 controls the determined data rate based on the number of allocated Walsh codes, and determines the controlled data rate (steps 1206 to 1210).

The above-stated (Stage #4) is performed when the number of the allocated Walsh codes is less than the maximum Walsh code number associated with the determined data rate. The DRC controller 1105 calculates the sequence repetition number using the ratio of the number of data modulation symbols per packet to the number of available data modulation symbols based on the number of allocated Walsh codes, and then controls the determined data rate according to the calculated sequence repetition number. Here, "controlling the determined data rate" includes an operation of determining to increase the number of slots for transmitting one packet according to the calculated sequence repetition number (step 1209), and an operation of determining to decrease the number of symbols of the transmission packet according to the calculated sequence repetition number (step 1210). The operation of down-controlling (decreasing) the determined data rate is performed when the calculated sequence repetition number is less than a predetermined value (Yes in step 1205).

That is, after the operations of (Stage #1 to (Stage #4), a process for setting the demodulation parameters according to the controlled data rate is performed. The demodulation parameters include the sequence repetition number 'r' determined by the ratio of the number of data modulation symbols per packet to the number of available data modulation symbols, the number Ns of slots for transmitting one packet, and the number 'p' of symbols of the transmission packet.

The parameters calculated by the DRC controller 1105 are transmitted to the base station, and thus can be used by the BS transmitter during signal modulation. Upon receiving the DRC information from the mobile station, the DRC controller 240 of the base station, shown in FIG. 11, can extract (select) the modulation parameters through the same process as <Process #3> to <Processes #6-1 and #6-2>. That is, after the operations of (Stage #1) to (Stage #4), the DRC controller 240 transmits information on the controlled data rate to the base station.

Figure 19:
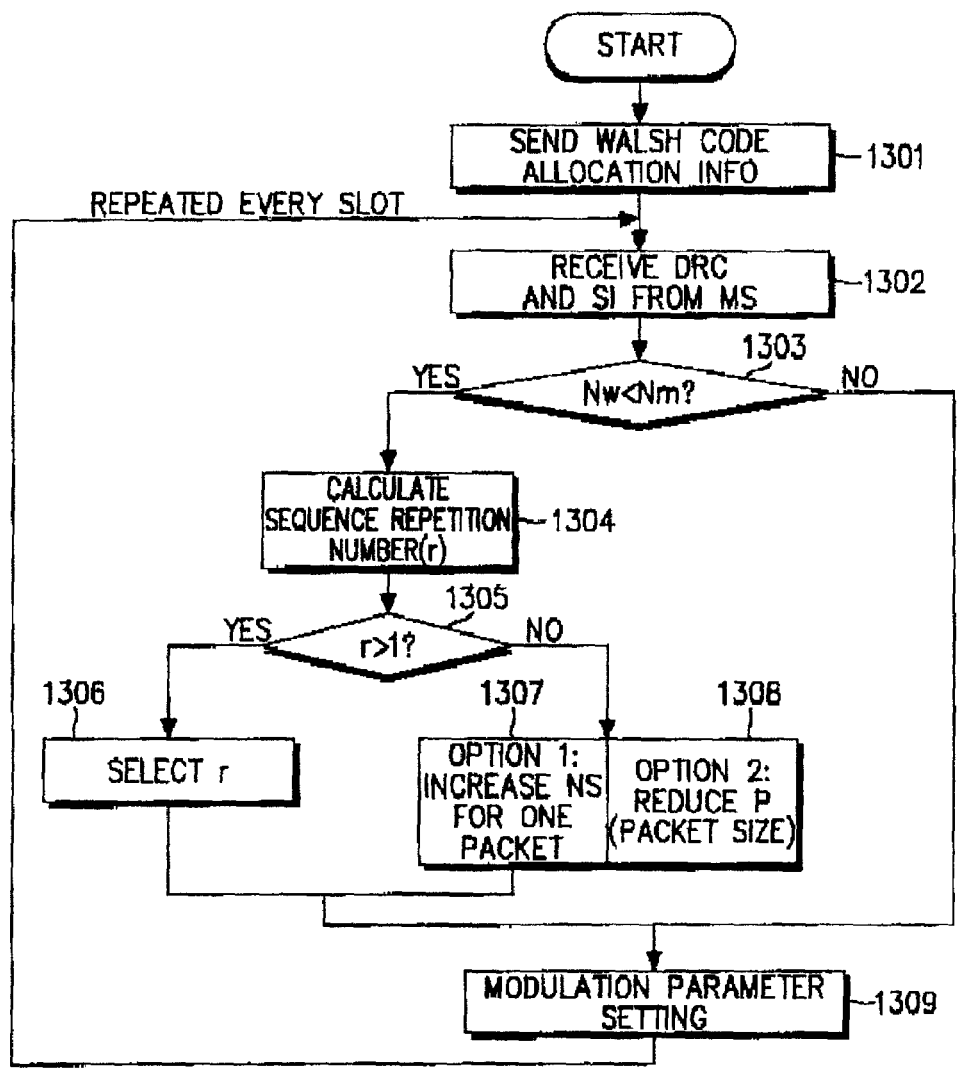
FIG. 19 is a flow chart illustrating a data rate determining operation by a base station according to an embodiment of the present invention.

FIG. 19 is a flow chart illustrating a data rate determining operation by a base station according to an embodiment of the present invention. Referring to FIG. 19, a BS transmitter (not shown) transmits Walsh code information to the mobile station every 20 ms frame (step 1301). The DRC controller 240 of the base station monitors a reverse DRC and a reverse sector indicator received every slot from the mobile station, to determine whether a transmission request is received from the mobile station (step 1302). If the reverse sector indicator indicates the base station, it is possible to determine the maximum data rate using the data rate information (DR index value) received at the same time. Unlike the mobile station, the base station knows the number of currently available Walsh codes. Therefore, the DRC controller 240 of the base station calculates the modulation parameters through <Process #3> to <Process #7> of FIG. 18 using the DR index and the available Walsh code allocation information, and sets the calculated modulation parameters to the modulator.

Embodiment #2

FIG. 20 is a flow chart illustrating an effective data rate determining operation by a mobile station according to an embodiment of the present invention. This operation is controlled by the DRC controller (740 of FIG. 14 or 1105 of FIG. 16) of the mobile station. In determining DRC information in accordance with the procedure of FIG. 20, a value determined by dividing the received total CIR value by the total number of available Walsh codes is used instead of the received total CIR value used in FIG. 18.

The flow chart of FIG. 20 can be divided into the following 7 processes.

<Process #1; step 2001>

The Walsh indicator channel demodulator 1107 of FIG. 16 receives Walsh code allocation information through the receiver 1101 every 20 ms frame of a predetermined time unit.

<Process #2; step 2002>

The CIR measurer 1104 measures CIR of every base station in the active set of the mobile station. Specifically, the CIR measurer 1104 measures CIR of a received packet channel from a forward burst pilot within the T1 time of FIG. 17.

<Process #3; step 2003>

The DRC controller 1105 divides the CIR values for the respective base stations by the number of available Walsh codes (i.e., the number of Walsh codes allocable in the corresponding base station). By doing so, the CIR value per Walsh code for each base station is calculated.

<Process #4; step 2004>

The DRC controller 1105 calculates the available maximum data rate of each base station using the value 'n' indicating the CIR value per Walsh code of each base station. Given the basic DR table of Table 3, the DRC controller 1105 selects a value corresponding to a value 'Q' (indicating a ratio of the measured CIR to the number of available Walsh codes) obtained by dividing the measured CIR value by the number of available Walsh codes, among the values 'n' of Table 3. Here, the value 'n' corresponding to the value 'Q' refers to a value 'n' corresponding to the maximum value for which the 'Q' value is less than or equal to the 'n' values. If the 'n' value is selected by the DRC controller 1105, the base station can use a data rate for which the modulation mode and the coding rate corresponding to the selected 'n' value are applied.

<Process #5; step 2005>

The DRC controller 1105 determines the number of slots in one physical layer packet (PLP) required when applying the modulation mode and the coding rate determined by the base station in <Process #4>. The number of slots in the PLP is so determined as to transmit at least 'i' modulation symbols in the corresponding modulation mode and the coding rate. The 'i' value indicates the total number of modulation symbols transmitted at the number of slots in the PLP for the case where the number of Walsh codes is 28.

A method for determining the slot number of the PLP will be described in detail. The "slot number of the PLP" refers to the minimum number of slots required in transmitting a total of 'i' modulation symbols transmitted when applying the modulation mode and the coding rate according to the determined maximum data rate 'a'. Therefore, the method for determining the number of slots in the PLP can be represented by, $$\text{Number Slots in Physical Layer Packet} = \left\lceil \frac{N}{\text{number of Walsh codes}} \cdot (\text{number '}i\text{' of modulation symbols}) + \text{preamble '}g\text{'} \over (\text{total number of chips per slot}) - \text{pilot} \right\rceil$$

Equation (6)

In Equation (6), the "number of Walsh codes" refers to the number of Walsh codes available for transmission of the packet data, and N ($N=2^n$; $n=1,2,3,4,5,6, \ldots$) indicates a spreading factor and can have a value of 8, 16, 32, 64 and 128 according to the system. Further, the "number of modulation symbols" corresponds to the value 'i' of Table 3, and "preamble" corresponds to the value 'g' of Table 3. In addition, the "pilot" indicates the number of chips occupied by a burst pilot in one slot. The preamble 'g' and the number 'i' of modulation symbols are determined according to the maximum data rate 'a' of Table 3 for the case where the 28 Walsh codes are used. In Equation (6), [X] indicates the minimum positive integer among integers larger than or equal to a given value 'x'.

The operation of determining the number of slots in the PLP by the mobile station, represented by Equation (6), can be equally applied even when the base station determines the number of slots in the PLP. The base station can determined the number of slots in the PLP in accordance with Equation (6), using the DRC information transmitted by the mobile station and the information on the number of Walsh codes allocable by the base station.

A length of the preamble in Equation (6) is determined as follows. The mobile station calculates a CIR per available Walsh code after measuring a receiving CIR value. The mobile station selects the maximum value less than or equal to the calculated CIR per Walsh code from the 'n' values of Table 3. An operation of calculating the selected maximum value 'x' can be represented by, $$\text{'}x\text{'} = [\text{Max '}n\text{'} | \text{'}n\text{'} < CIR \text{ per Walsh Code}] \quad \text{Equation (7)}$$

The length of the preamble is selected based on a value determined by multiplying the value 'x' calculated in Equation (7) by the number of available Walsh codes. The length of the preamble is equivalent to a preamble length in a row to which the value 'm' having the maximum value less than or equal to {'x'×(the number of available Walsh codes)} belongs. However, if the number of Walsh codes is 28 which is the maximum number of available Walsh codes, the length of the preamble is equivalent to a preamble length in a row to which the value 'm' having the maximum value less than or equal to the measured CIR belongs.

<Process #6; step 2006>

The DRC controller 1105 calculates an effective data rate in accordance with Equation (8), using the number of slots in the PLP of each base station, calculated in <Process #5>, and the number 'c' of bits per packet determined according to the modulation mode and the coding rate determined in <Process #4>.

$$EffectiveDataRate = \frac{NumberofBitsinanEncoderPackets \cdot 'c'}{(NumberofSlotsinanEncoderPackets) \cdot 125 \text{ m sec}}$$ Equation (8)

In Equation (8), "Number of slots in an Encoder Packet" indicates the number of slots in an encoder packet for the case where the number of Walsh codes calculated in <Process #5> is less than 28 Nm.

base station calculates the number of slots in the physical layer packet, using the maximum data rate 'a' for the case where 28 Walsh codes are used and the number of Walsh codes available for transmission of the packet data, and then transmits the packet data using the modulation mode 'e' and the coding rate 'd' determined to be used for the data rate for the case where 28 Walsh codes are used.

The flow chart of FIG. 20 provides a method for determining the maximum data rate 'a' and the number of slots in the physical layer packet, for the previously determined maximum data rate 'a', the number 'c' of bits per physical layer packet, the coding rate 'd', the modulation mode 'e', the number 'g' of chips in a preamble and the number 'i' of modulation symbols per physical layer packet. However, the method for determining the maximum data rate 'a' and the number of slots in the physical layer packet can be equally applied even to the maximum data rate 'a', the number 'c' of bits per physical layer packet, the coding rate 'd', the modulation mode 'e', the number 'g' of chips in a preamble and the number 'i' of modulation symbols per physical layer packet.

Meanwhile, compared with Table 3, Table 4 shows a data rate table for the case where the number of available 32-ary Walsh codes is less than 28.

TABLE 4

| DR Index | 'a' Effective Data rate (kbps) | 'b' Slots per Packet | 'c' Bits in Physical Layer Packet | 'd' Coding rate | 'e' Quad-Symbol Mapping | 'f' symbols/ I or Q arm per packet | 'g' Pre-amble Symbols | 'h' Pilot Chips per packet | 'i' Available Data Chips per packet ('b'*1536 − 'g' − 'h') | 'j' Available Walsh Ratio (Nw = 28 = Nm) | 'k' Available Data Modulation Symbols ('i'*'j') | 'l' Repetition number (r) ('k'/'f') |
|---|---|---|---|---|---|---|---|---|---|---|---|---|
| i | Variable | Variable | Fixed | Fixed | Fixed | Fixed | Fixed | Variable | Variable | Variable | Variable | Variable |

<Process #7; step 2007>

The DRC controller 1105 selects a base station supporting the highest effective data rate based on the effective data rates of the respective base stations calculated in <Process #6>, and transmits information on one data rate among the maximum data rates 'a' of Table 3 calculated by Equation (3) to the selected base station as DRC information. The DRC information is transmitted along with a sector indicator (SI). The sector indicator indicates a base station having the highest effective data rate to which the DRC information is to be transmitted.

The data rate determining method described in FIG. 20 is to measure/calculate CIR per Walsh code, and based on the calculated CIR per Walsh code, determines the maximum data rate for the case where 28 Walsh codes are used. After determination of the maximum data rate for the case where 28 Walsh codes are used, the modulation mode and the coding rate shown in Table 3 are determined. The determined modulation mode 'e' and coding rate 'd' are considered together with the number of Walsh codes available for transmission of the packet data, thereby to determine an effective data rate of each base station. The DRC controller 1105 of the mobile station calculates effective data rates of every base station in its active set, designates a base station supporting the highest effective data rate with the SI, and then transmits the maximum data rate 'a' for the case where 28 Walsh codes are used, to the designated base station as DRC information. Upon receipt of the DRC information, the In Table 4, the values 'a', 'b', 'h', 'i', 'j', 'k' and 'l' are variable according to the decrease in the number of the 32-ary Walsh codes. However, the values 'c', 'd', 'e', 'f' and 'g' are fixed regardless of the number of Walsh codes, once the DR index is determined.

An operation of determining the data rate according to the procedure shown in FIG. 18 will be described with reference to Table 4. For convenience sake, the following assumptions are given with reference to Table 3.

(Assumption 1) The number of available Walsh codes is 14.

(Assumption 2) A relationship 'I=2×H' is realized between H and I of Table 3.

If the CIR value received at the mobile station is '1.5×H', a DR index #8 (614.4 Kbps, a data rate for the case where 28 Walsh codes are used) of Table 3 is selected regardless of the number of Walsh codes. In this state, if the method shown in FIG. 20 is applied, a DR index #9 (1.2288 Mbps, a data rate for the case where 28 Walsh codes are used) available for '1.5H/14', the CIR value per Walsh code, will be selected. Therefore, when applying the method shown in FIG. 18, the modulation mode and the coding rate of the DR index #9 are used, and the number of slots in the physical layer packet is controlled so as to transmit at least 1064 modulation symbols. When applying Equation (6), the required number of slots in the physical layer packet is calculated as 2. As a result, the effective data rate becomes 614.4 Kbps indicated by the DR index #9, rather than 1.2288 Mbps.

Figure 21:
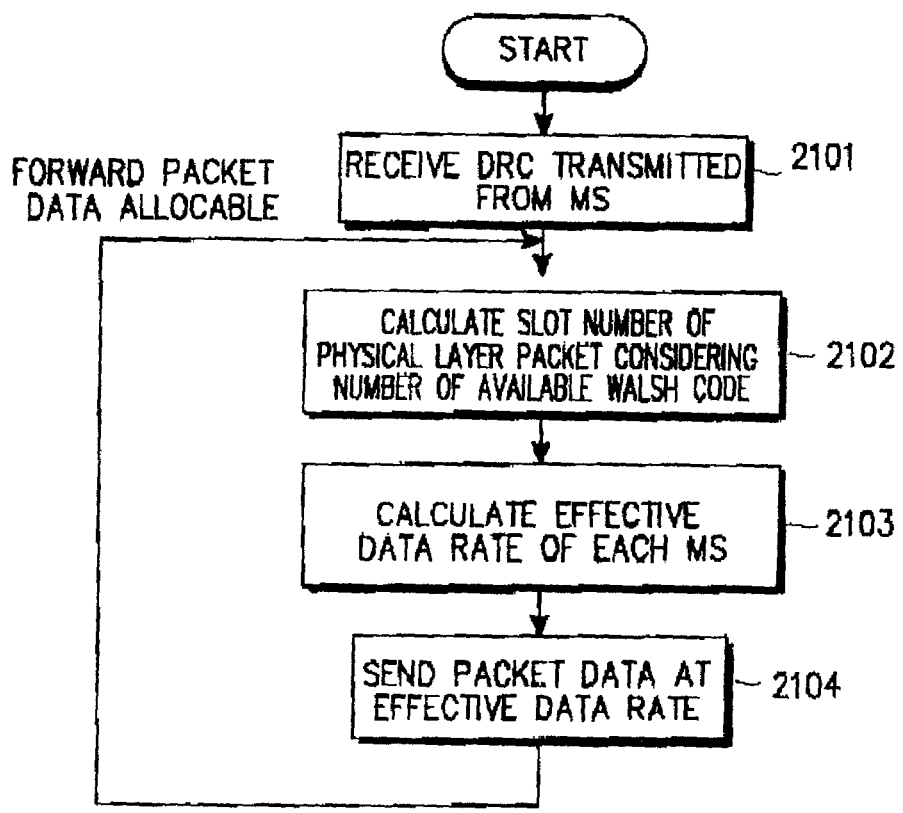
FIG. 21 is a flow chart illustrating an effective data rate determining operation by a base station according to an embodiment of the present invention.

FIG. 21 is a flow chart illustrating an effective data rate determining operation by a base station according to an embodiment of the present invention. This operation is controlled by the DRC controller of the base station.

The procedure shown in FIG. 21 can be divided into the following 4 processes.

<Process #1; step 2101>

The BS receiver receives the DRC information transmitted from the respective mobile stations.

<Process #2; step 2102>

The DRC controller 240 of the base station calculates the number of slots required in transmitting the PLP for the respective mobile stations in accordance with Equation (7).

<Process #3; step 2103>

The DRC controller 240 determines the effective data rate using the number of transmission bits and the number of slots required in transmitting the PLP, included in the DRC information, for the respective mobile stations.

<Process #4; step 2104>

The DRC controller 240 controls the corresponding transmission blocks 214, 215, 216 and 217 so as to transmit the packet data at the determined effective data rate.

As described above, the novel mobile communication system supporting the voice and packet data services determines a data rate for the packet data service considering not only the CIR (Carrier-to-Interference Ratio) of a received signal but also the number available orthogonal (Walsh) codes, thereby making it possible to transmit forward packet data at the maximum data rate while performing a circuit call.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a data rate for a packet data service in a mobile station for a mobile communication system including a base station, the mobile station being provided with a voice service and a packet data service from the base station, comprising the steps of:
   receiving orthogonal code allocation information indicating a number of orthogonal codes allocated for the packet data service;
   measuring a carrier-to-interference ratio (CIR) using a received pilot channel;
   determining a data rate corresponding to the measured CIR; and
   controlling the determined data rate based on the number of the allocated orthogonal codes and thus determining a controlled data rate.

2. The method as claimed in claim 1, wherein the determined data rate is decreased when the number of the allocated orthogonal codes is less than the number of all orthogonal codes.

3. The method as claimed in claim 2, further comprising the step of calculating a sequence repetition number determined by a ratio of the number of data modulation symbols per packet to the number of available data modulation symbols based on the number of the allocated orthogonal codes, wherein the determined data rate is controlled according to the calculated sequence repetition number.

4. The method as claimed in claim 3, wherein the determined data rate is decreased by determining to increase the number of slots for transmitting one packet according to the calculated sequence repetition number.

5. The method as claimed in claim 4, wherein the determined data rate is decreased when the calculated sequence repetition number is less than a predetermined value.

6. The method as claimed in claim 3, wherein the determined data rate is decreased by determining to decrease the number of symbols in a transmission packet according to the calculated sequence repetition number.

7. The method as claimed in claim 6, wherein the determined data rate is decreased when the calculated sequence repetition number is less than a predetermined value.

8. The method as claimed in claim 1, wherein the orthogonal code allocation information is received from the base station in a predetermined time unit.

9. The method as claimed in claim 8, wherein the predetermined time unit is a frame unit.

10. The method as claimed in claim 1, further comprising the step of transmitting information on the controlled data rate to the base station.

11. The method as claimed in claim 1, further comprising the step of setting demodulation parameters according to the controlled data rate.

12. The method as claimed in claim 11, wherein the demodulation parameters include (i) a sequence repetition number determined by a ratio of the number of data modulation symbols per packet to the number of available data modulation symbol, (ii) the number of slots for transmitting one packet, and (iii) the number of symbols in a transmission packet.

13. A method for determining a data rate for a packet data service in a mobile station for a mobile communication system including a plurality of base stations, the mobile station being provided with a voice service and a packet data service from the base stations, comprising the steps of:
   receiving orthogonal code allocation information indicating the number of orthogonal codes allocated for the packet data service from the respective base stations;
   measuring CIRs using pilot channels received from the respective base stations;
   determining data rates corresponding to the measured CIRs of the respective base stations;
   selecting a base station having the highest data rate among the data rates of the respective base stations;
   controlling the determined data rate of the selected base station based on the number of the allocated orthogonal codes and determining a controlled data rate; and
   transmitting information on the controlled data rate to the selected base station.

14. The method as claimed in claim 13, wherein the determined data rate is decreased when the number of the allocated orthogonal codes is less than the number of orthogonal codes corresponding to the determined data rate.

15. The method as claimed in claim 14, further comprising the step of calculating a sequence repetition number determined by a ratio of the number of data modulation symbols per packet to the number of available data modulation symbols based on the number of the allocated orthogonal codes, wherein the determined data rate is controlled according to the calculated sequence repetition number.

16. The method as claimed in claim 15, wherein the determined data rate is decreased by determining to increase the number of slots for transmitting one packet according to the calculated sequence repetition number.

17. The method as claimed in claim 16, wherein the determined data rate is decreased when the calculated sequence repetition number is less than a predetermined value.

18. The method as claimed in claim 15, wherein the determined data rate is decreased by determining to decrease the number of symbols in a transmission packet according to the calculated sequence repetition number.

19. The method as claimed in claim 18, wherein the determined data rate is decreased when the calculated sequence repetition number is less than a predetermined value.

20. The method as claimed in claim 13, wherein the orthogonal code allocation information is received from the base stations in a predetermined time unit.

21. The method as claimed in claim 20, wherein the predetermined time unit is a frame unit.

22. The method as claimed in claim 13, further comprising the step of setting demodulation parameters according to the controlled data rate.

23. The method as claimed in claim 22, wherein the demodulation parameters include (i) a sequence repetition number determined by a ratio of the number of data modulation symbols per packet to the number of available data modulation symbol, (ii) the number of slots for transmitting one packet, and (iii) the number of symbols in a transmission packet.

24. A method for determining a data rate for a packet data service in a mobile communication system including a base station and a mobile station being provided with a voice service and a packet data service from the base station, comprising the steps of:
measuring a CIR using a received pilot channel by the mobile station;
determining by the mobile station a data rate corresponding to a data rate corresponding to the measured CIR, and transmitting information on the determined data rate to the base station; and
upon receiving the information on the determined data rate, controlling by the base station the determined data rate based on the number of orthogonal codes allocated for the packet data service, and determining a controlled data rate.

25. The method as claimed in claim 24, wherein the determined data rate is decreased when the number of the allocated orthogonal codes is less than the number of orthogonal codes corresponding to the determined data rate.

26. The method as claimed in claim 25, further comprising the step of calculating a sequence repetition number determined by a ratio of the number of data modulation symbols per packet to the number of available data modulation symbols based oh the number of the allocated orthogonal codes, wherein the determined data rate is controlled according to the calculated sequence repetition number.

27. The method as claimed in claim 26, wherein the determined data rate is decreased by determining to increase the number of slots for transmitting one packet according to the calculated sequence repetition number.

28. The method as claimed in claim 27, wherein the determined data rate is decreased when the calculated sequence repetition number is less than a predetermined value.

29. The method as claimed in claim 26, wherein the determined data rate is decreased by determining to decrease the number of symbols in a transmission packet according to the calculated sequence repetition number.

30. The method as claimed in claim 29, wherein the determined data rate is decreased when the calculated sequence repetition number is less than a predetermined value.

31. The method as claimed in claim 24, further comprising the step of setting modulation parameters according to the controlled data rate.

32. The method as claimed in claim 31, wherein the modulation parameters include (i) a sequence repetition number determined by a ratio of the number of data modulation symbols per packet to the number of available data modulation symbol, (ii) the number of slots for transmitting one packet, and (iii) the number of symbols in a transmission packet.

33. A mobile station for determining a data rate for a packet data service in a mobile communication system including a base station, the mobile station being provided with a voice service and a packet data service from the base station, comprising:
a receiver for receiving orthogonal code allocation information indicating the number of orthogonal codes allocated for the packet data service;
a measurer for measuring a CIR using a received pilot channel; and
a controller for determining a data rate corresponding to the measured CIR, controlling the determined data rate based on the number of the allocated orthogonal codes, and determining a controlled data rate.

34. The mobile station as claimed in claim 33, wherein the controller decreases the determined data rate when the number of the allocated orthogonal codes is less than the number of orthogonal codes corresponding to the determined data rate.

35. The mobile station as claimed in claim 34, wherein the controller calculates a sequence repetition number determined by a ratio of the number of data modulation symbols per packet to the number of available data modulation symbols based on the number of the allocated orthogonal codes, and controls the determined data rate according to the calculated sequence repetition number.

36. The mobile station as claimed in claim 35, wherein the controller decreases the determined data rate by determining to increase the number of slots for transmitting one packet according to the calculated sequence repetition number.

37. The mobile station as claimed in claim 36, wherein the controller decreases the determined data rate when the calculated sequence repetition number is less than a predetermined value.

38. The mobile station as claimed in claim 35, wherein the controller decreases the determined data rate by determining to decrease the number of symbols in a transmission packet according to the calculated sequence repetition number.

39. The mobile station as claimed in claim 38, wherein the controller decreases the determined data rate when the calculated sequence repetition number is less than a predetermined value.

40. The mobile station as claimed in claim 33, wherein the orthogonal code allocation information is received from the base station in a predetermined time unit.

41. The mobile station as claimed in claim 33, wherein the predetermined time unit is a frame unit.

42. The mobile station as claimed in claim 33, further comprising a transmitter for transmitting information on the controlled data rate to the base station.

43. An apparatus for determining a data rate for a packet data service in a mobile communication system including a base station and a mobile station being provided with a voice service and a packet data service from the base station, comprising:

the mobile station for measuring a CIR using a received pilot channel, determining a data rate corresponding to the measured CIR, and transmitting information on the determined data rate to the base station; and the base station for receiving the information on the determined data rate, controlling the determined data rate based on the number of orthogonal codes allocated for the packet data service, and determining a controlled data rate.

44. The apparatus as claimed in claim 43, wherein the base station decreases the determined data rate when the number of the allocated orthogonal codes is less than the number of orthogonal codes corresponding to the determined data rate.

45. The apparatus as claimed in claim 44, wherein the base station calculates a sequence repetition number determined by a ratio of the number of data modulation symbols per packet to the number of available data modulation symbols based on the number of the allocated orthogonal codes, and controls the determined data rate according to the calculated sequence repetition number.

46. The apparatus as claimed in claim 45, wherein the base station decreases the determined data rate by determining to increase the number of slots for transmitting one packet according to the calculated sequence repetition number.

47. The apparatus as claimed in claim 46, wherein the base station decreases the determined data rate when the calculated sequence repetition number is less than a predetermined value.

48. The apparatus as claimed in claim 45, wherein the base station decreases the determined data rate by determining to decrease the number of symbols in a transmission packet according to the calculated sequence repetition number.

49. The apparatus as claimed in claim 48, wherein the base station decreases the determined data rate when the calculated sequence repetition number is less than a predetermined value.

50. The method as claimed in claim 1, further comprising the steps of:

selecting a highest controlled data rate among the controlled rate of each base station;

selecting a base station having the highest data rate as a base station to which a data rate request is to be transmitted; and transmitting a signal for selecting the determined base station.

51. The mobile station as claimed in claim 33, further comprising a transmitter for transmitting a signal for selecting a base station to which a data rate request is to be transmitted, wherein the controller selects a highest controlled rate among the control rate of each base station, and selects a base station having the highest data rate among the data rates of the respective base station as the base station to which the data rate request is to be transmitted.

52. The mobile station as claimed in claim 51, further comprising a memory for storing a plurality of data rates associated with a plurality of CIRs, wherein the controller selects the data rate corresponding to the measured CIR from the memory.

* * * * *